(12) United States Patent
Yamada

(10) Patent No.: US 10,445,029 B2
(45) Date of Patent: Oct. 15, 2019

(54) SERVER SYSTEM, PORTABLE TERMINAL APPARATUS, OPERATION INFORMATION COLLECTION SYSTEM, NON-TRANSITORY COMPUTER-READABLE STORAGE MEDIUM, METHOD OF OPERATING SERVER SYSTEM, AND METHOD OF OPERATING PORTABLE TERMINAL APPARATUS

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/049,654

(22) Filed: Jul. 30, 2018

(65) Prior Publication Data

US 2019/0034132 A1  Jan. 31, 2019

(30) Foreign Application Priority Data

Jul. 31, 2017  (JP) .................................. 2017-147921

(51) Int. Cl.
*G06F 3/12* (2006.01)

(52) U.S. Cl.
CPC .......... *G06F 3/1207* (2013.01); *G06F 3/1229* (2013.01); *G06F 3/1234* (2013.01); *G06F 3/1259* (2013.01); *G06F 3/1261* (2013.01); *G06F 3/1288* (2013.01); *G06F 3/1292* (2013.01)

(58) Field of Classification Search
CPC .... G06F 3/1207; G06F 3/1234; G06F 3/1261; G06F 3/1259; G06F 3/1288
USPC ....................................................... 358/1.14
See application file for complete search history.

(56) References Cited

U.S. PATENT DOCUMENTS

| | | | | |
|---|---|---|---|---|
| 2013/0335772 | A1* | 12/2013 | Waller | ............... H04N 1/00244 |
| | | | | 358/1.15 |
| 2015/0070725 | A1* | 3/2015 | Monden | ................ G06F 3/1232 |
| | | | | 358/1.15 |
| 2017/0070642 | A1* | 3/2017 | Miyamoto | ............... B41J 29/38 |
| 2017/0242642 | A1* | 8/2017 | Barribeau | ............. G06F 3/1206 |
| 2018/0113659 | A1* | 4/2018 | Matsui | .................. G06F 3/1204 |

FOREIGN PATENT DOCUMENTS

JP  2008-242564 A  10/2008

* cited by examiner

*Primary Examiner* — Neil R McLean
(74) *Attorney, Agent, or Firm* — Workman Nydegger

(57) ABSTRACT

A server system that collects operation information on a printer through a network includes a communication interface that receives the operation information; and a processor that causes a display screen that is based on the operation information, to be displayed on a portable terminal apparatus that is connected through the network. The processor performs processing that causes the display screen, within one screen of which pieces of information that are remaining times to completion of printing by a plurality of the printers or pieces of printing completion time information on the plurality of the printers are arranged, to be displayed on a display unit of the portable terminal apparatus.

14 Claims, 18 Drawing Sheets

FIG. 6

| TYPE | ADDRESS | OPERATION INFORMATION |
|---|---|---|
| ELAPSED TIME FROM POWERING-OFF | a1 | v1 |
| AMOUNT OF CONSUMED Y INK | a2 | v2 |
| AMOUNT OF CONSUMED M INK | a3 | v3 |
| AMOUNT OF CONSUMED C INK | a4 | v4 |
| AMOUNT OF CONSUMED K INK | a5 | v5 |
| ACCUMULATION NUMBER OF ROTATIONS OF ROLLER | a6 | v6 |
| ⋮ | ⋮ | ⋮ |

FIG. 7

| ACQUISITION DATE | PRINTER IDENTIFICATION INFORMATION | OPERATION INFORMATION |
|---|---|---|
| t1 | id1 | ... |
| t2 | id1 | ... |
| t3 | id3 | ... |
| t4 | id2 | ... |
| t5 | id5 | ... |
| t6 | id2 | ... |
| ⋮ | ⋮ | ⋮ |

FIG. 9

| TYPE | VALUE | EVENT |
|---|---|---|
| STATUS INFORMATION | ANY ONE OF PRINTING IN PROCESS, BEING ON STANDBY, WARNING IN PROGRESS, AND BEING IN ERROR | CHANGE IN STATUS |
| REMAINING-TIME INFORMATION | TIME AND MINUTES (EXAMPLE, ONE HOUR 45 MINUTES) | CHANGE IN REMAINING TIME |
| QUANTITY OF CONSUMED CONSUMABLE MATERIALS REMAINING QUANTITY OF CONSUMABLE MATERIALS | %, m (EXAMPLE, 60%, 75 m) | CONSUMPTION PRESCRIBED QUANTITY |
| JOB NAME | EXECUTABLE-FILE NAME (EXAMPLE, Sample_image.pdf) | STARTING OF NEW JOB |

SERVER SYSTEM, PORTABLE TERMINAL APPARATUS, OPERATION INFORMATION COLLECTION SYSTEM, NON-TRANSITORY COMPUTER-READABLE STORAGE MEDIUM, METHOD OF OPERATING SERVER SYSTEM, AND METHOD OF OPERATING PORTABLE TERMINAL APPARATUS

BACKGROUND

1. Technical Field

The present invention relates to a server system, a portable terminal apparatus, an operation information collection system, a non-transitory computer-readable storage medium, a method of operating the server system, a method of operating the portable terminal apparatus, and the like.

2. Related Art

In the related art, a server system is known that is connected to a network and collects pieces of operation information on a plurality of pieces of equipment. It is considered that there are also various types of equipment, pieces of operation information on which are targets for collection, and for example, there is production equipment such as a printer.

It is considered that there are many uses of the operation information that is collected by the server system. For example, the server system transmits the collected operation information to a terminal apparatus that is used by a user. When this is done, it is possible that the user checks an operation state of a printer using the terminal apparatus. For example, it is also possible that the user who stays at a place that is located far from the printer monitors the operation state (for example, a state of progress in performing a job) of the printer remotely.

In JP-A-2008-242564, there are disclosed a technique in which a standard for a length of the time it takes from the time a request for processing a job is made to an image processing apparatus until processing starts in the image processing apparatus is displayed on a display unit of a terminal that is connected to the image processing apparatus through a network and a technique in which a display mode changes with a length of waiting time.

It is considered that in a company or the like that uses a printer for the purpose of business, a certain employee is in charge of management of a plurality of printers. In this case, because the terminal apparatus of the user acquires pieces of operation information on the plurality of printers, if display is not performed in a suitable display mode, an interface that is easy to use by the user cannot be realized.

In JP-A-2008-242564, estimated waiting time in a printer driver that results when a job is assigned is displayed, and it is not assumed that the pieces of operation information on the plurality of printers are displayed. To begin with, in JP-A-2008-242564, after a job is assigned, monitoring of progress in performing the job is not performed.

SUMMARY

An advantage of some aspects of the invention is to provide a server system, a portable terminal apparatus, an operation information collection system, a non-transitory computer-readable storage medium, a method of operating the server system, a method of operating the portable terminal apparatus, and the like, which display pieces of operation information on a plurality of printers, in a suitable display mode, on a display unit of the portable terminal apparatus.

According to an aspect of the invention, there is provided a server system that collects operation information on at least one printer through a network, the system including: a communication unit that receives the operation information on the printer; and a processor that causes a display screen that is based on the operation information, to be displayed on a portable terminal apparatus that is connected through the network, in which the processor performs processing that causes the display screen, within one screen of which pieces of information that are remaining times to completion of printing by a plurality of the printers or pieces of printing completion time information on the plurality of the printers are arranged, to be displayed on a display unit of the portable terminal apparatus.

In the server system that collects operation information, a display screen, within one screen of which pieces of information on the plurality of the printers are arranged, may be caused to be displayed on the display unit of the portable terminal apparatus. When this is done, it is possible that the pieces of remaining-time information and the pieces of printing completion time information on the plurality of the printers are displayed in a more perspicuous manner without a user performing a complicated operation.

Furthermore, in the server system, the processor may perform processing that causes a display mode for the printer in which an event occurs to change to a display mode that is different from display modes for other printers.

When this is done, it is possible that the information on the printer of which an operation state changes due to an event is presented in a manner that is easy to understand.

Furthermore, in the server system, the event may be an event in which an error or a warning occurs in the printer.

When this is done, it is possible that the information on the printer in which an abnormality occurs is presented in a manner that is easy to understand.

Furthermore, in the server system, in a case where the event in which the error occurs is detected, the processor may perform processing that causes information that specifies a time for interruption of a printing operation by the printer due to the error, to be displayed on the display unit of the portable terminal apparatus.

When this is done, it is possible that information associated with the error is presented to the user.

Furthermore, in the server system, in a case where the event in which the error occurs is detected, the processor may perform processing that causes at least one of information that specifies a job at the time of the occurrence of the error and information on progress in performing the job at the time of the occurrence of the error, to be displayed on the display unit of the portable terminal apparatus.

When this is done, it is possible that information associated with the error is presented to the user.

Furthermore, in the server system, in a case where it is detected that the event occurs in the printer, the processor may perform processing that makes push notification of an instruction to update the display screen to the portable terminal apparatus.

In a case where the event occurs, by using the push notification, it is possible that the display on the push notification is promptly updated in the portable terminal apparatus, and so forth.

Furthermore, the server system may further include a database that results from associating the portable terminal apparatus and the plurality of printers, pieces of operation information on which are targets for display in the portable terminal apparatus with each other, in which the processor may perform processing that updates the database based on setting information that is received from the portable terminal apparatus.

When this is done, it is possible that the printer which is a display target is managed in the server system or that a selection of the display target is caused to be made on the portable terminal apparatus side.

Furthermore, in the server system, in the case of a first display setting, the processor may perform processing that causes a name of a file that is being printed to be displayed on the display unit of the portable terminal apparatus, and in the case of a second display setting that is different from the first display setting, the processor may perform processing that causes information that substitutes for the name of the file, to be displayed on the display unit of the portable terminal apparatus.

When this is done, it is possible that switching between the display of the name of the file and the display of the information that substitutes for the name of the file takes place according to a setting.

Furthermore, in the server system, the processor may perform processing that causes the display screen, within one screen of which pieces of job history information on a plurality of the printers are arranged, to be displayed on the display unit of the portable terminal apparatus.

When this is done, in a case where many jobs are performed using the plurality of the printers, it is possible that monitoring of the progress in performing the many jobs are realized and so forth.

Furthermore, in the server system, the processor may perform processing that causes a display area for a first printer and a display area for a second printer which is different from the first printer, among a plurality of the printers, to be displayed in different sizes on the display unit of the portable terminal apparatus.

By setting the display area in accordance with the printer in this manner, it is possible that the restricted display area is efficiently used.

Furthermore, in the server system, the processor may perform at least one of processing that causes a display area for the printer on standby to be displayed in a smaller size than a display area for the printer that is performing a job, processing that causes a display area for the selected printer to be displayed in a greater size than a display area for the printer that is not selected, and processing that causes a display area for the printer in which an error occurs to be displayed in a greater size than a display area for the printer in which the error does not occur.

When this is done, the display area for the printer that has high priority is relatively increased and the display area for the printer that has low priority is relatively decreased. Because of this, it is possible that the restricted display area is efficiently used.

Furthermore, according to another aspect of the invention, there is provided a portable terminal apparatus that is communicatively connected to a server system which collects operation information on at least one printer, through a network, the apparatus including: a communication unit that receives operation information on the printer; a display unit on which the operation information is displayed; and a processor that performs control of display on the display unit, in which the processor performs processing that displays a display screen, within one screen of which pieces of information that are remaining times to completion of printing by a plurality of the printers or pieces of printing completion time information on the plurality of the printers are arranged.

In the portable terminal apparatus, based on the information that is received from the server system that collects the operation information, a display screen, within one screen of which pieces of information on the plurality of the printers are arranged, may be caused to be displayed. When this is done, it is possible that the pieces of remaining-time information and the pieces of printing completion time information on the plurality of the printers are displayed in a more perspicuous manner without a user performing a complicated operation.

Furthermore, in the portable terminal apparatus, in a case where any printer is selected from among the plurality of the printers, the pieces of remaining-time information or the pieces of printing completion time information on which are displayed, the processor may perform processing that enlarges the display area for the selected printer and displays detail information.

When this is done, in a case where pieces of operation information on the plurality of the printers are set to be display targets, it is also possible that detail information on a given printer is suitably displayed.

Furthermore, in the portable terminal apparatus, the processor may perform counting-down processing of the remaining time that is the information, based on the remaining-time information that is received by the communication unit and on clocking information from a timer, and may perform processing that displays the display screen, within one screen of which the pieces of remaining-time information on the plurality of the printers, which results after the counting-down processing are performed on the plurality of the printers, are arranged.

The remaining-time that is the information is counted down in this manner. Thus, the remaining-time information can be caused to change with the passage of time, and it is possible that the display which causes the user to feel less uncomfortable is performed.

Furthermore, according to still another aspect of the invention, there is provided an operation information collection system including: any server system described above; and the portable terminal apparatus.

Furthermore, according to still another aspect of the invention, there is a non-transitory computer-readable storage medium on which a program that causes a portable terminal apparatus, which is communicatively connected to a server system that collects operation information on at least one printer, through a network, to operate is stored, the program causing the computer to function as: a communication unit that receives the operation information on the printer; and a processor that performs control of display on the display unit on which the operation information is displayed, in which the processor performs processing that displays a display screen, within one screen of which pieces of information that are remaining times to completion of printing by a plurality of the printers or pieces of printing completion time information on the plurality of the printers are arranged.

Furthermore, according to still another aspect of the invention, there is provided a method of operating a server system that collects operation information on at least one printer through a network, the method including: receiving the operation information on the printer; performing display processing that causes a display screen that is based on the operation information, to be displayed on a portable terminal apparatus that is connected through the network; and performing, as the display processing, processing that causes the display screen, within one screen of which pieces of information that are remaining times to completion of printing by a plurality of the printers or pieces of printing completion time information on the plurality of the printers are arranged, to be displayed on a display unit of the portable terminal apparatus.

Furthermore, according to still another aspect of the invention, there is provided a method of operating a portable terminal apparatus that is communicatively connected to a server system that collects operation information on at least one printer, through a network, the method of operating the portable terminal apparatus that receives the operation information on the printer, performs control of display of the operation information, and performs processing that displays a display screen, within one screen of which pieces of information that are remaining times to completion of printing by a plurality of printers or pieces of printing completion time information on the plurality of printers are arranged.

BRIEF DESCRIPTION OF THE DRAWINGS

The invention will be described with reference to the accompanying drawings, wherein like numbers reference like elements.

FIG. 6 is an example of a data structure of operation information that is stored in the printer.

FIG. 7 is an example of the data structure of the operation information that is stored in the information processing apparatus or the like.

FIG. 9 is a specific example of first information.

DESCRIPTION OF EXEMPLARY EMBODIMENTS

The present embodiment will be described below. It is noted that the present embodiment which will be described below does not improperly limit the subject matter of the invention that is stated by a claim. Furthermore, all configurations that will be described in the present embodiment are not limited to being configurational requirements for the invention.

Furthermore, an example in which equipment, operation information on which is a target for collection, is a printer (a printing apparatus) is described below, but it is possible that the equipment, the operation information on which is the target for collection includes other equipment (for example, production equipment other than the printer). Furthermore, a terminal apparatus (a terminal apparatus 9 in FIG. 1 and other figures) is a portable terminal apparatus in a narrow sense.

1. Operation Information Collection System

Figure 1:
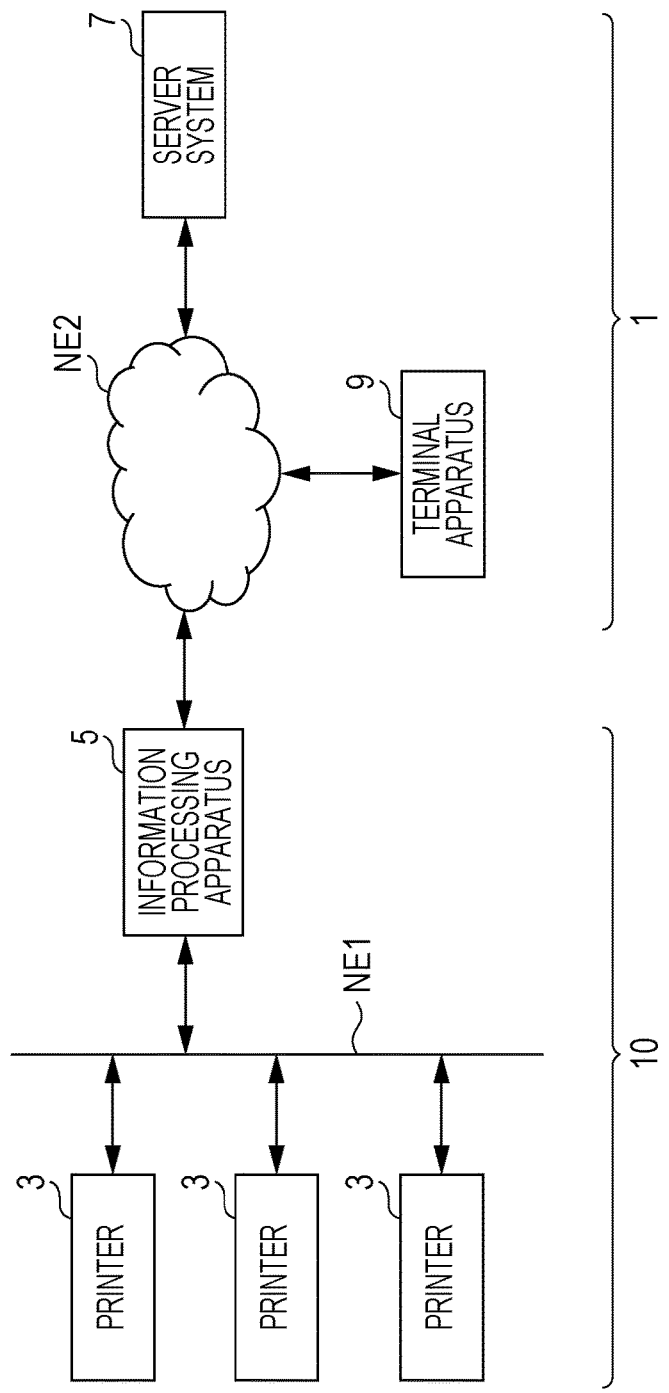
FIG. 1 is a configurational example of an operation information collection system.

FIG. 1 is a diagram that schematically illustrates an example of an operation information collection system according to the invention. The operation information collection system 1 includes a server system 7 that collects operation information on a printer 3 through an information processing apparatus 5, and the terminal apparatus 9. The server system 7 transmits the collected operation information to the terminal apparatus 9. It is noted that all pieces of operation information, which are collected by the server system 7, do not need to be pieces of information that are targets for transmission to the terminal apparatus 9. For example, the server system 7 may transmit information that results from extracting a portion of the operation information, or information that results from process processing, such as statistical processing, on the operation information, to the terminal apparatus 9. The terminal apparatus 9 displays the information, which is received from the server system 7, on the display unit, or performs reporting by making a rumbling sound or the like.

However, a system that includes the operation information collection system 1 is not limited to a configuration in FIG. 1, and various modifications are possible such as omission of one or several constituent elements in the configuration and addition of other constituent elements. For example, the information processing apparatus 5 is omitted from FIG. 1, and each printer 3 may be connected directly to a network NE2 (the Internet).

As illustrated in FIG. 1, a plurality of printers 3 and the information processing apparatus 5 are connected to the network NE1, and possibly communicate bidirectionally with each other through the network NE1. Furthermore, the information processing apparatus 5 and the server system 7 are connected to the network NE2, and possibly communicate with each other through the network NE2. Furthermore, the terminal apparatus 9 is also connected to the network NE2, and the server system 7 and the terminal apparatus 9 possibly communicate bidirectionally with each other through the network NE2.

For example, a network NE1 is a local area network (LAN), and the network NE2 is the Internet. However, the LAN or the Internet is one that is illustrated as an example of a communication network, and thus a specific configuration for connecting between the printer 3 and the information processing apparatus 5, between the information processing apparatus 5 and the server system 7, and between the server system 7 and the terminal apparatus 9 is not limited to these.

A system 10 that is configured with the plurality of printers 3 and the LAN, and the information processing apparatus 5 collects the operation information on each printer 3 using the information processing apparatus 5, and transmits the collected pieces of operation information to an external server system 7. The information processing apparatus 5, for example, is an apparatus that is set up within a facility of the same company, and may be a personal computer (PC) or may be a server within a company. It is noted that one system 10 is illustrated in FIG. 1, but that a plurality of system 10 may be connected to the server system 7.

The printer 3 includes a display unit 333, as will be described below with reference to FIG. 2. For this reason, if a user performs a job near the printer 3, and it is possible that the user recognizes a state of the printer by browsing through the operation information that is displayed on the display unit 333. However, it is also considered that the user performs a job at a place distant from the printer 3.

For example, in a small- or middle-scale company (office) for which a small number of employees work, in addition to operating the printer 3, the user needs to perform tasks, such as accounting, sales, and product delivery, and a situation where the user performs a job at a place distant from the printer 3 takes place. For this reason, it is important to set up a system in which an operation state of the printer 3 can be checked using the terminal apparatus 9 that is operated by the user. Specifically, the terminal apparatus 9 receives, display, and reports information that is based on the operation information which is collected by the server system 7, and the user performs remote monitoring of the operation state of the printer 3.

Furthermore, in the case of a comparatively large-scaled office, it is possible that a person is assigned to each printer 3 (each production line). However, a manager who controls a plurality of production lines in general cannot always check the display units 333 of all printers 3. For this reason, in order to suitably know overall progress in performing a job, it is important to display information with the terminal apparatus 9, and in this case, the operation information collection system 1 that is illustrated in FIG. 1 is also useful.

It is noted that one terminal apparatus 9 is illustrated in FIG. 1, but that a plurality of terminal apparatuses 9 may be present. For example, a plurality of users within a company that uses one system 10 may perform the reception and browsing-through of information by terminal apparatuses 9 of the plurality of users.

Furthermore, in a case where a plurality of systems 10 are connected to the server system 7, one or more terminal apparatus 9 may be used for each system 10.

2. Detailed Configurational Example of Each Apparatus

Next, a configurational example of each of the printer 3, the information processing apparatus 5, the server system 7, and the terminal apparatus 9 will be described.

2.1 Printer

Figure 2:
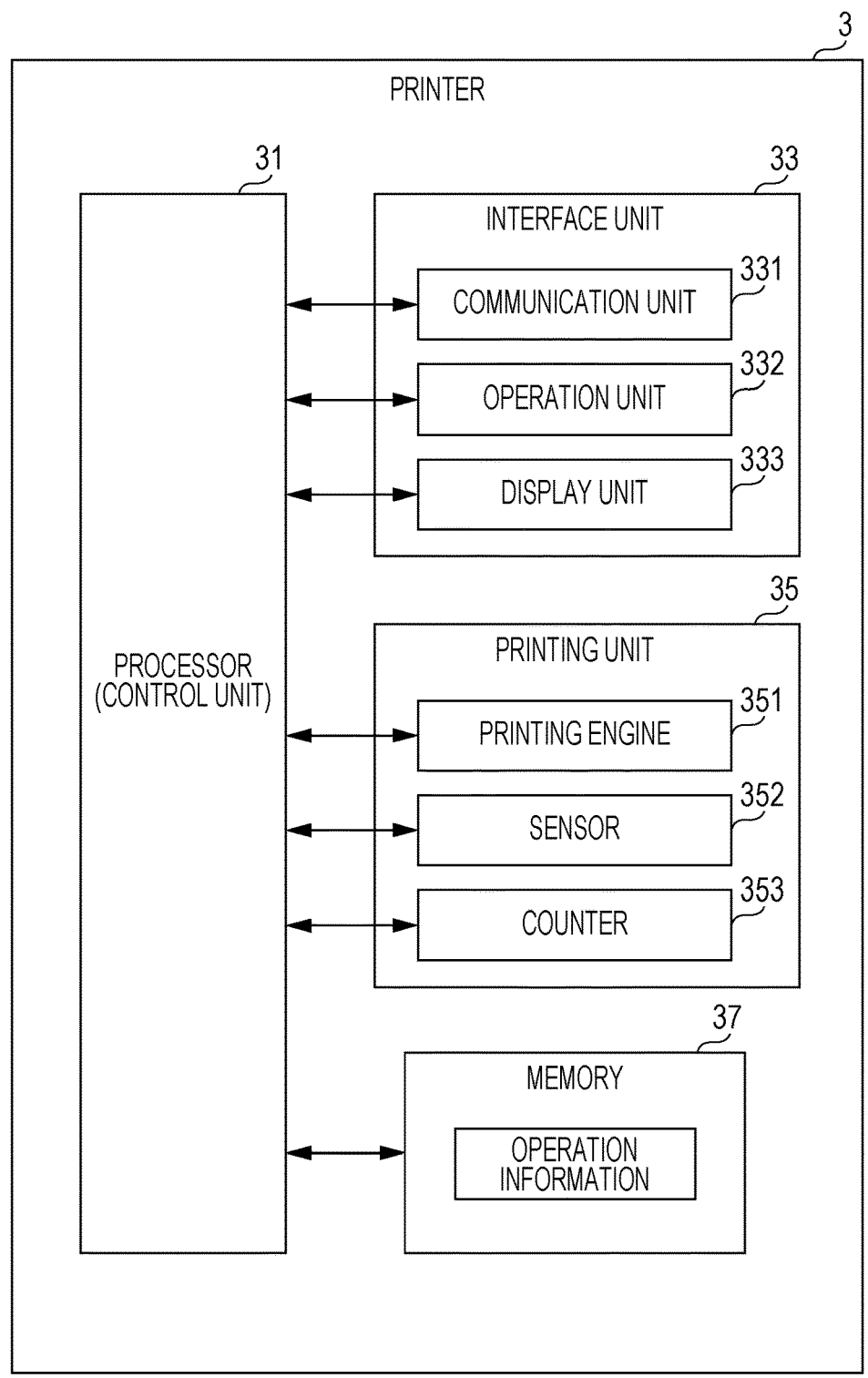
FIG. 2 is a configurational example of a printer.

FIG. 2 is a block diagram illustrating an example of a configuration of the printer 3. The printer 3 includes a processor 31, an interface unit 33, a printing unit 35, and a memory 37. The processor 31 controls in an integrated manner an operation that is performed in the printer 3. A function of the processor 31 can be realized by various processors such as a central processing unit (CPU), hardware such as application specific integrated circuit (ASIC) (a gate array or the like), a program, or the like. The interface unit 33, the printing unit 35, and the memory 37 operate under the control of the processor 31.

The interface unit 33 includes a communication unit 331, an operation unit 332, and the display unit 333. The communication unit 331 is connected to a LAN, and performs communication with the information processing apparatus 5 through the LAN. Furthermore, the operation unit 332 is configured with a button or the like on which an input operation from the user is applied, and the display unit 333 is configured with a display or the like on which various pieces of information relating to the printer 3 are displayed for the user. It is noted that the operation unit 332 and the display unit 333, for example, may be configured to be integrated with a touch panel.

The printing unit 35 includes a printing engine 351, a sensor 352, and a counter 353. The printing engine 351 is mechanically configured to perform printing of an image on a printing medium. The printing engine 351 discharges ink from an ink jet-type discharge head to a winding-type printing medium that is transported with rollers in tow, and thus printers an image on the printing medium. It is noted that a specific configuration of the printing engine 351 is not limited to one that is described here and that the printing engine 351 may perform printing on a paper sheet-type printing medium and may perform printing with a toner using a laser method. The sensor 352 detects various physical quantities associated with an operation state of the printing engine 351, and the counter 353 counts various numerical values that change according to operation of the printing engine 351.

As physical quantity illustrating the operation state of the printing engine 351, for example, a voltage that is applied to an electrical component of the printing engine 351, temperature and humidity within the printing engine 351, a position of the discharge head or the printing medium, and the like. In order to detect these physical quantities, various sensors 352 are provided such a voltage sensor, a temperature and humidity sensor, a position sensor, an acceleration sensor, and the like. Furthermore, as numerical values that change according to the operation of the printing engine 351, for example, there are a time that elapsed after the printing engine 351 is powered on, the accumulation sum of lengths of the printing media on which the printing is performed, an amount of consumed ink (or a remaining amount of ink), the accumulation number of rotations of a mechanical component (for example, a roller that transports the printing medium) and the like. Then, in order to count these numerical values, various counters 353 are provided.

The memory 37 is configured with a storage medium such as a hard disk drive (HDD), a read only memory (ROM), or a random access memory (RAM). Stored in the memory 37 is status information (an error, a warning, or the like) on the printer 3, identification information (a job name) on a job that is performed in the printer 3, information (printing time information or progress information) indicating progress in performing a job, data that is output from the sensor 352 and the counter 353, or the like, as the operation information indicating an operation situation of the printer 3.

2.2 Information Processing Apparatus

Figure 3:
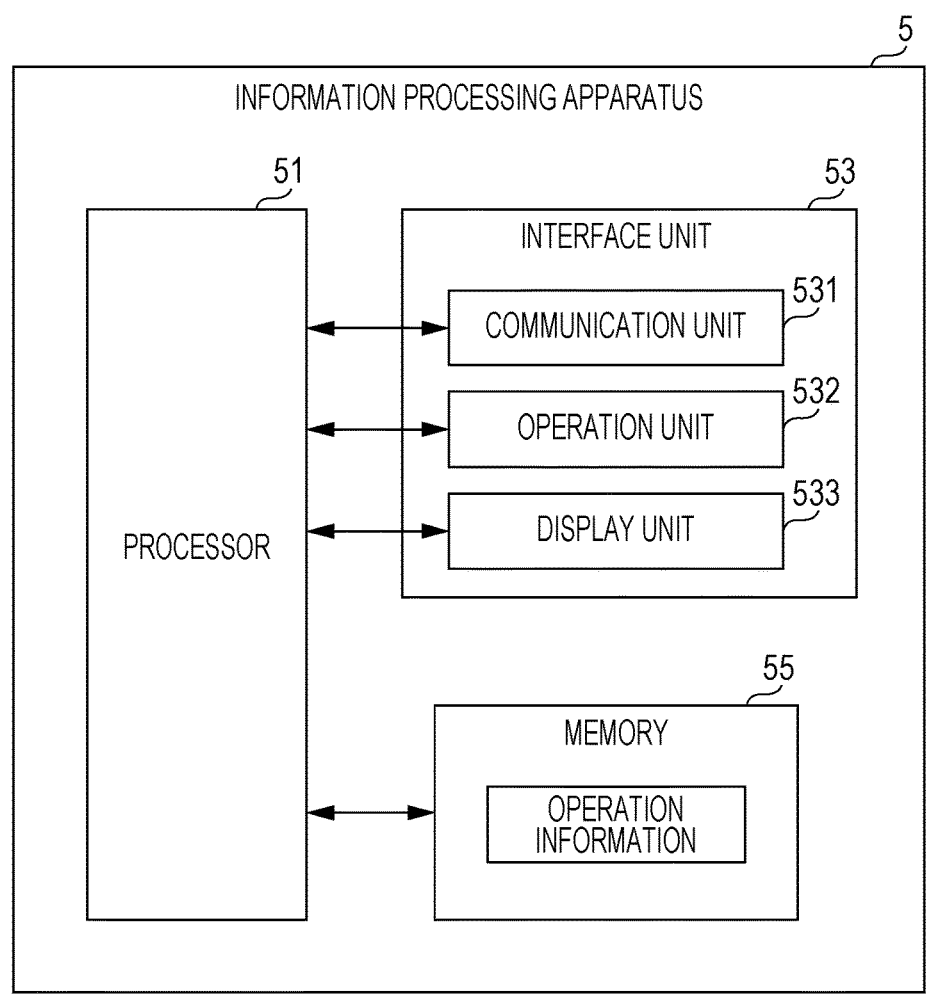
FIG. 3 is a configurational example of an information processing apparatus.

FIG. 3 is a block diagram illustrating an example of a configuration of the information processing apparatus 5. The information processing apparatus 5 includes a processor 51, an interface unit 53, and a memory 55, accesses the memory 37 of each of the plurality of printers 3 to collect the operation information, and performs an information relay operation of transmitting the collected information to the server system 7. The processor 51 is a processor such as a CPU, and performs the information relay operation using the interface unit 53 and the memory 55.

The interface unit 53 includes a communication unit 531, an operation unit 532, and a display unit 533. The communication unit 531 is connected to the LAN and the Internet. The communication unit 531 performs communication with each printer 3 through the LAN and, along with this, performs communication with the server system 7 through the Internet. Furthermore, the operation unit 532 is configured with a mouse, a keyboard, or the like on which the input operation from the user is applied, and the display unit 533 is configured with a display or the like on which various pieces of information are displayed for the user. It is noted that the operation unit 532 and the display unit 533, for example, may be configured to be integrated with a touch panel.

The memory 55 is configured with a storage medium, such as a HDD, a ROM, a RAM. The operation information that is received by the communication unit 531 from the printer 3 is stored in the memory 55. The information processing apparatus 5 is one that acquires pieces of operation information from a plurality of printers 3. Because of this, identification information (a printer ID) on the printer 3, and pieces of information such as the status information described above are stored in the memory 55 in a state of being associated with each other.

2.3 Server System

Figure 4:
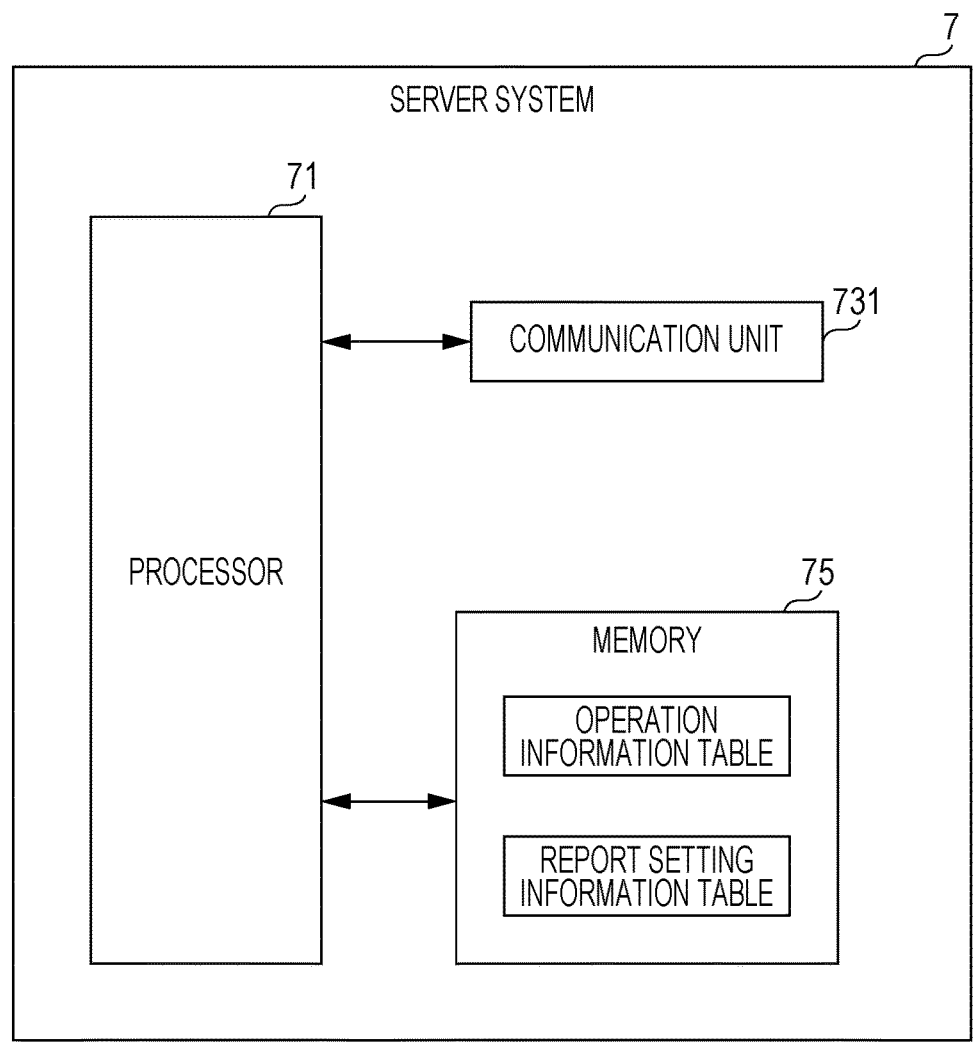
FIG. 4 is a configurational example of a server system.

FIG. 4 is a block diagram illustrating an example of a configuration of the server system 7. The server system 7 includes a processor 71 (a processor), a communication unit 731 (a communication interface), and a memory 75 (a storage device). The server system 7 receives the operation information that is collected by the information processing apparatus 5, and along with this, transmits the operation information to the terminal apparatus 9. A function of the processor 71 can be realized by various processors such as a CPU, hardware such as an ASIC, a program, or the like, and the processor 71 performs a prescribed operation using the communication unit 731 and the memory 75.

The communication unit 731 is connected to the Internet, and the communication with the information processing apparatus 5 or the terminal apparatus 9 is performed through the Internet. It is noted that the server system 7 may include an operation unit or a display unit that is not illustrated. The operation unit is configured with a mouse, a keyboard, or the like on which the input operation from the user is applied, and the display unit is configured with a display or the like on which various pieces of information are displayed for the user. However, the server system 7 may perform management of the server system 7 using an external apparatus (a terminal apparatus for management) without including the operation unit and the display unit. For example, the server system 7 may function as a Web server, in a mode where the server system 7 operates using software (a web browser) which runs on an external apparatus and where various pieces of information are displayed on a display unit of the external apparatus.

The memory 75 is configured with a storage medium, such as a HDD, a ROM, or a RAM. The operation information from the printer 3 and report setting information are stored in the memory 75. The memory 75 may be a database (a relational database in a narrow sense), and an operation information table and a report setting information table are stored in the memory 75. The operation information table is a table in which the operation information is stored. The report setting information table is a table that is used in a case where push notification is performed on the terminal apparatus 9. The push notification here refers to a communication type in which transmission of information from the transmitting side is performed although a request from the receiving side is not present. The push notification from the server system 7 to the terminal apparatus 9 is the transmission of information to the terminal apparatus 9 with the server system 7 being a source.

It is noted that the server system 7 is not limited to one that is realized as one server. For example, the server system 7 may include a database server (the memory 75) in which the operation information table or the like is stored, and an application server (one of the processor 71 and the communication unit 731) that performs transmission and reception of information to and from the terminal apparatus 9. Alternatively, the server system 7 may include a server for load distribution or a server for the push notification to the terminal apparatus 9. Moreover, the database server or the application server, or the like may be realized by an operation of performing distribution to a plurality of servers. Furthermore, each server that makes up the server system 7 may be a server (a virtual server) that is virtualized. In this case, each virtual server may operate on the same server (the same physical server), and may operate on a different physical server. Furthermore, dynamic scheduling (for example, a dynamic change in the number of virtual servers) may be performed on the server system 7 by monitoring a communication load or the like. That is, various modifications to the server system 7 according to the present embodiment are possible in terms of the number of physical servers, the number of virtual servers in a case where the servers are virtualized, a correspondence between a virtual server and a physical server, or the like.

2.4 Terminal Apparatus

Figure 5:
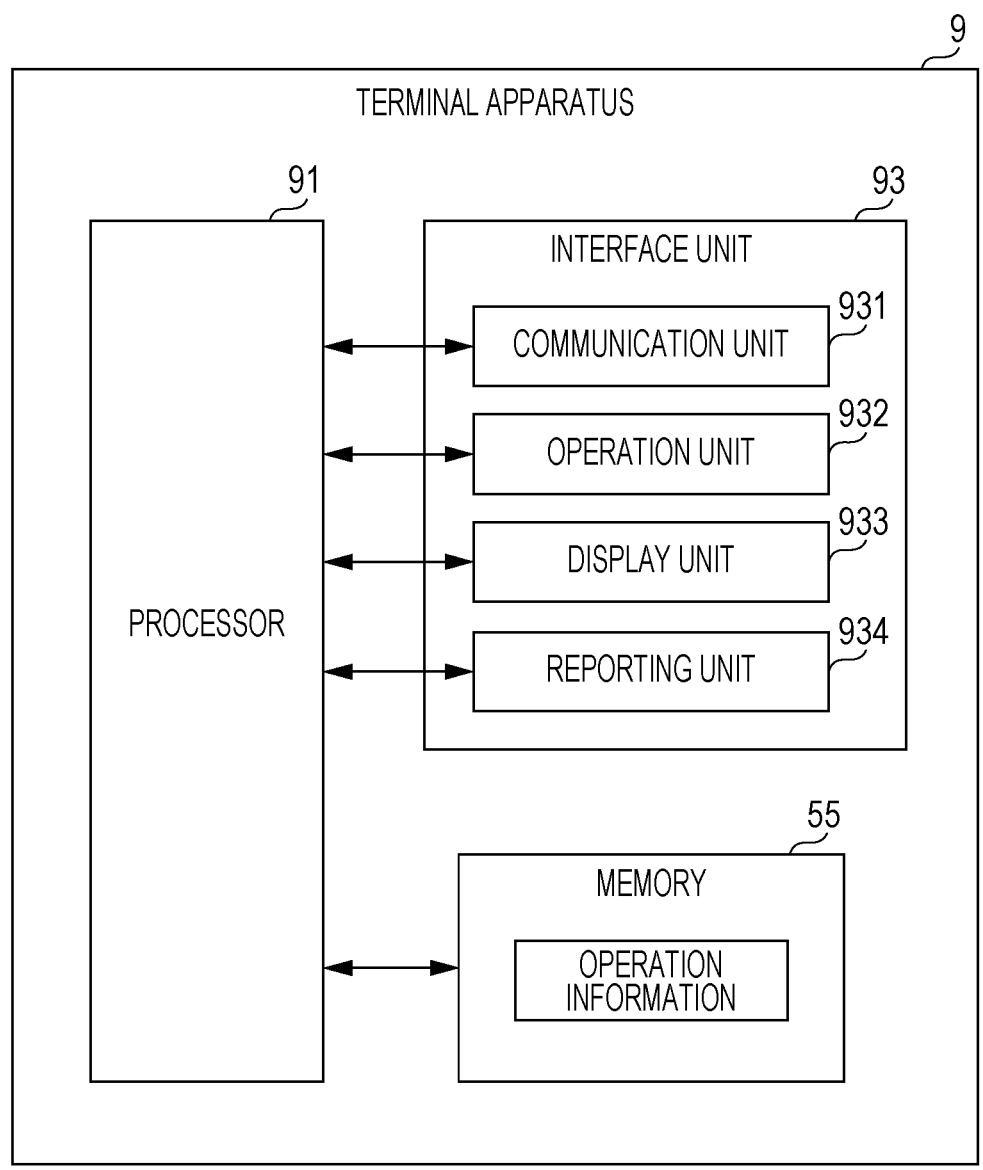
FIG. 5 is a configurational example of a terminal apparatus (a portable terminal apparatus).

FIG. 5 is a block diagram illustrating an example of a configuration of the terminal apparatus 9. The terminal apparatus 9 includes a processor 91 (a processor), an interface unit 93, and a memory 95 (a storage device) and receives the operation information that is collected by the server system 7. A function of the processor 91 can be realized by various processors such as a CPU, hardware such as an ASIC, a program, or the like.

The interface unit 93 includes a communication unit 931 (a communication interface), an operation unit 932, a display unit 933, and a reporting unit 934. The communication unit 931 is connected to the Internet and performs the communication with the server system 7 through the Internet. The operation unit 932 is configured with a button or the like on which the input operation from the user is applied, and the display unit 933 is configured with a display or the like on which various pieces of information are displayed for the user. It is noted that the operation unit 932 and the display unit 933, for example, may be configured to be integrated with a touch panel. The reporting unit 934 performs reporting to the user. The reporting unit 934 may be, for example, a speaker that performs reporting using audio, may be a vibration (a vibration motor) that performs reporting using vibration, and may be a combination of these.

The memory 95 is configured with a storage medium, such as a HDD, a ROM, or a RAM. Stored in the memory 95 may be software (an application) that performs acquisition processing, display processing, or the like of the operation information from the server system 7. Furthermore, the operation information that is received from the server system 7 is stored in the memory 95.

3. Communication of the Operation Information

Next, a technique of transmitting and receiving the operation information between each of the apparatuses that are illustrated in FIGS. 1 to 5 will be described above.

3.1 Communication Between the Printer and the Information Processing Apparatus

FIG. 6 is a diagram that schematically illustrates an aspect of storage of the operation information in the memory 37 of the printer 3. As illustrated in FIG. 6, in the memory 37, a type of operation information and a memory address are associated with each other, and each piece of operation information is stored in an address that corresponds to a type thereof. In the given specific example, operation information v1 indicating a value of the elapsed time from powering-off is stored in an address a1 that corresponds to a type thereof. However, modifications are possible such as when the operation information and an update time (a time stamp) for the operation information are stored in the memory 37 in a state of being associated with each other.

The processor 31 or the printing unit 35 (the sensor 352 or the counter 353) of the printer 3 periodically (at all times in a narrow sense) monitors the operation state, and in a case where the operation state changes, the operation information on the memory 37 is updated.

The processor 51 (the communication unit 531) of the information processing apparatus 5 performs polling, and periodically acquires the operation information from one or more printers 3 that are connected through the LAN.

If there is a case where, as illustrated in FIG. 6, in the memory 37 of the printer 3, the type and the address of the operation information are associated with each other, the processor 51 accesses the address that corresponds to the operation information which is a target for collection, and collects the operation information that is stored in the address. For example, the processor 51 sets previously-collected information, which undergoes a change, to be a target for collection. Alternatively, based on a mode, a firmware version, or the like of the printer 3, the processor 51 determines the operation information on every printer 3, which is a target for collection.

FIG. 7 is a diagram that schematically illustrates an aspect of storage of the operation information in the memory 55 of the information processing apparatus 5. As illustrated in FIG. 7, the operation information is stored in the memory 55 in a state of being associated with the identification information (an ID or a serial number) on the printer 3 and acquisition time information. It is noted that in the same manner as in the example in FIG. 6, a combination of a type of information ("an amount of consumed Y ink," or the like) and a specific value (the number of times of discharge, a volume, a ratio, or the like in the case of an amount of consumed ink), although omitted in FIG. 7, is stored as the operation information in the memory 55.

Figure 8:
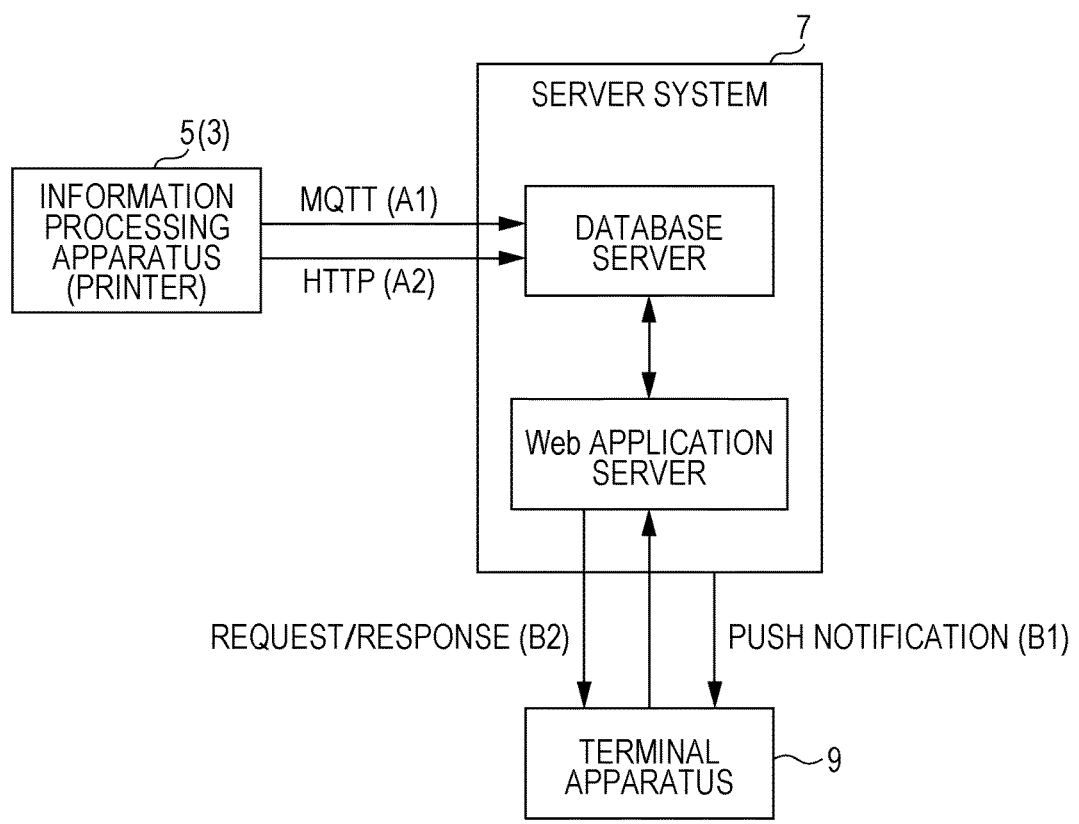
FIG. 8 is a schematic diagram of a communication mode between the information processing apparatus, the server system, and the terminal apparatus.

3.2 Communication Between the Information Processing Apparatus and the Server System FIG. 8 is a diagram that schematically illustrates an aspect of communication between the information processing apparatus 5 (the printer 3), the server system 7, and the terminal apparatus 9. The server system 7 receives the operation information that is transmitted from the information processing apparatus 5, and stores the received operation information in the operation information table of the memory 75. The communication unit 731 of the server system 7 receives the operation information from the information processing apparatus 5 (or directly from the printer 3) by performing a plurality of communication processing operations. For example, the communication unit 731 performs first communication processing that maintains an established state of communication connection after establishment of the communication connection, and second communication processing that releases the communication connection when information is received after the establishment of the communication connection. The first communication processing is communication processing that, for example, uses a message queueing telemetry transport (MQTT), and the second communication processing that, for example, uses a hypertext transfer protocol (HTTP). It is noted that the communication unit 731 (along with the communication unit 531 and the communication unit 931) may realize the first communication processing and the second communication processing through a secure connection that uses a secure sockets layer (SSL) or the like.

The communication unit 731, as indicated by A1 in FIG. 8, receives first information that is the operation information which has a high-real time attribute, by performing the first communication processing. The first information, for example, is information indicating a status (a status change) of the printer 3. In a case where the printer 3 proceeds from a normal operation state (printing in progress) to a warning state or an error state, in order to continue or resume a job (printing), there is a strong need for the user to return to the printer 3 and perform a certain job. The warning state is a state (for example, a state where a remaining amount of ink decreases and so forth) in which there is a concern that the printing will not be continued, and the error state refers to a state where a printing operation is interrupted due to a certain abnormality. Alternatively, in a case where a job is ended in the printer 3 and proceeding from the normal operation state (printing in progress) to an idle state (on standby) takes place, it is possible that the user returns to a place where the printer 3 is installed and then causes the printer 3 to efficiently operate by assigning a new job. Consequently, a status change from printing in progress to being on standby is also information that has a high-real time attribute.

Consequently, it is desirable that information indicating the status change is transmitted to the server system 7 (and the terminal apparatus 9) as earlier as possible after the status change in the printer 3 occurs. Consequently, in a case where an event indicating the status change occurs, for example, the communication unit 531 (or the communication unit 331 of the printer 3) of the information processing apparatus 5 performs transmission of the operation information, which is triggered by the occurrence of the event (which is caused by an event trigger), to the server system 7 using MQTT.

Specifically, in a case where an event occurs, the communication unit 531 (the communication unit 331) transmits the operation information to the server system 7 immediately (in real time). When this is done, it is possible that the server system 7 suitably receives information that has a high-real time attribute.

FIG. 9 is a specific example of the first information among pieces of operation information, and is a specific example of an event that corresponds to each piece of information. As the first information, in addition to the status information, remaining-time information indicating remaining time to job completion, information, such as a quantity of consumed consumable materials (liquid ink or toner, or a printing medium such as a paper sheet or a piece of cloth) or a remaining amount of consumable material, and information, such as a name of a job that is performed in the printer 3 are considered.

As illustrated in FIG. 9, the status information is a value of any one of "printing in progress," "being on standby," "being in a warning state," and "being in error." "Printing in progress" corresponds to the normal operation state described above, "being on standby" corresponds to the idle state, "warning in progress" corresponds to a warning state, and "being in error" corresponds to an error state. Then, an event that triggers the transmission of the status information to the server system 7 is an event in which a value of the status information changes. It is noted that pieces of equipment, that is, the printer 3, the information processing apparatus 5, and the server system 7 may be managed with transitioning to "warning in progress" or "being in error" and transitioning to "printing in progress," or "being on standby" being separated as different events. While the former is an event indicating an abnormal state where operation of the printer 3 stops or where there is a concern that the operation of the printer 3 will stop, the latter is an event indicating a starting point or an ending point in normal operations such as printing starting and ending.

The remaining-time information is information indicating remaining time to printing completion, and for example, is information indicating remaining hours and minutes. Instead of the remaining-time information, printing completion time information indicating a printing completion time may be set to be first information. The event that triggers the transmission of the remaining-time information to the server system 7 is an event in which the remaining-time information changes. For example, in a case where a flushing operation occurs while the printing is in progress and where the remaining time increases, the printer 3 or the information processing apparatus 5 determines that an event occurs.

The information that is the remaining quantity of consumable materials is a remaining quantity of printing media. The remaining amount of ink is a ratio of a remaining amount to a full capacity of an ink tank which is assumed to be 100%, and a unit of the remaining amount is a percentage. The remaining quantity of printing media may be, for example, the number of sheets, and, in a case where a rolled sheet or the like is used, may be a length (unit: m). An event that triggers transmission of the information that is the remaining quantity of consumable materials to the server system 7 may be an event in which the remaining quantity changes by only a prescribed quantity (a prescribed ratio, a prescribed number of sheets, or a prescribed length), and may be an event in which the remaining quantity falls below a given threshold. Furthermore, as the information on the consumable material, information that is a quantity of consumed materials may be used instead of the remaining-quantity information.

The information that is the job name is a file name (an image file name or the like) that is a printing target. An event that triggers transmission of the job name to the server system 7 is an event indicating performance of a new job. It is noted that an event indicating the performance of a new job may be managed, as an event that is the same as an event (a printing starting event) indicating the transitioning from "being on standby" to "printing in progress," in the printer 3 or the like. Furthermore, the job name is not limited to the name of the job that is being performed. It is also possible that the job names extensively include job names (job history information) of jobs of which the number is prescribed, which were performed in the past.

It is noted that the communication unit 531 (the communication unit 331) may reduce the number of transmissions of information to the server system 7, depending on a type of first information. Specifically, the communication unit 531 does not perform the transmission of the information although a new event occurs for a prescribed period of time (for example, for several minutes), after the previous information is transmitted. When this is done, it is possible that a communication load between the information processing apparatus 5 (the printer 3) and the server system 7 is reduced. For example, the communication unit 731 of the server system 7 transmits particularly status information that has a real-time attribute, among pieces of first information, immediately after an event occurs, and imposes an upper limit on the frequency with which the other pieces of information are received.

In contrast to the first information described above, the second information, which results from counting the number of rotations of a roller of the printing unit 35, the number of times that a header reciprocates, the number of times that cleaning is performed, or the like, is useful in terms of long-term maintenance of the printer 3, but there is a weak need for the user to browse through the second information within several minutes after counting-up is performed. Consequently, the communication unit 731 of the server system 7, as indicated by A2 in FIG. 8, receives the second information from the information processing apparatus 5 using HTTP or the like. Then, the reception of the second information using HTTP is performed less frequently (for example, approximately several times per day) than the first information.

3.3 Communication Between the Server System and the Terminal Apparatus

A plurality of paths for communication between the server system 7 and the terminal apparatus 9 are considered. As indicated by B1 in FIG. 8, the communication unit 731 of the server system 7 performs the push notification on the terminal apparatus 9, and the terminal apparatus 9 performs the reception of the push notification by the communication unit 931 and reporting (rumbling) by the reporting unit 934. In other words, the push notification is communication processing that transmits the operation information, which is performed at the initiative of the server system 7 side.

The information, the push notification of which is performed, is information that has a high-real time attribute, among pieces of first information. Specifically, among the pieces of information described above, with the push notification, a change in the status information is transmitted to the terminal apparatus 9. It is noted that the information that is transmitted with the push notification is post-change status information itself. Alternatively, only the information (for example, "occurrence of an error," or the like) indicating that the change in the status information occurs may be transmitted with the push notification, and specific status information may be transmitted through communication that is indicated by B2, which will be described above.

It is noted that, based on the report setting information table in the memory 75, the server system 7 (the processor 71) determines whether or not to perform the push notification on the terminal apparatus 9. A report setting table, for example, is information that results from associating identification information on the terminal apparatus 9, the identification information on the printer 3 that is a target for report, a time span during which reporting is possible, and a day of the week on which reporting is possible with each other. When this is done, it is possible that the server system 7 performs the push notification of suitable information to the user at a suitable timing. For example, in a case where a company to which a certain user belongs has a plurality of printers 3, control is possibly performed in such a manner that the processor 71 (the communication unit 731) limitedly performs the push notification of only information on a printer of which the certain user is in charge or in such a manner that the processor 71 does not perform outside working hours for the certain user.

When compared with the status information, it is difficult for a problem to occur, although an aspect is that the remaining-time information, the information that is the remaining quantity of consumed consumable materials, and the job name, which have low priority, are received in a case where there is a request from the user (from the terminal apparatus 9).

Consequently, as indicated by B2 in FIG. 8, the communication unit 931 of the terminal apparatus 9 transmits a request to the server system 7 (a Web application server), and the server system 7 replies with the operation information as a response to the request. This communication is performed using, for example, HTTP, and is performed at the time of activation of an application software (a so-called smartphone application) in the terminal apparatus 9, or at the time of an update operation by the user. In other words, the communication for the request/response that is indicated by B2 is communication processing that acquires the operation information, which is performed at the initiative of the terminal apparatus 9 side (the user side).

In the communication that is indicated by B2, the terminal apparatus 9 receives the first information described above from the server system 7. When this is done, it is possible that information which is useful for remote monitoring of the printer 3, which uses the terminal apparatus 9, is presented to the user. It is noted that the communication unit 731 of the server system 7 does not need to reply with all pieces of first information described above, and may reply with one or several pieces of the information. For example, in a case where only one or several pieces of information that are display targets are requested at the request of the terminal apparatus 9, the communication unit 731 of the server system 7 replies with only the information that is requested.

Furthermore, in a case where the request from the terminal apparatus 9 is present, in the communication that is indicated by B2, the communication unit 731 of the server system 7 is not prevented from replying with the second information as a response.

4. Display on a Portable Terminal Apparatus

In the present embodiment, as the terminal apparatus 9, a portable terminal apparatus such as a smartphone is assumed. Furthermore, in the present embodiment, monitoring of progress in performing various jobs that use a plurality of printers 3 is assumed to be performed using the portable terminal apparatus. In this case, a display unit of the portable terminal apparatus is smaller in size than a display unit of stationary-type equipment such as a PC, and an amount of information that can be displayed at a time on the display unit thereof is limited. Consequently, it is important to suitably determine a mode for display of the operation information in monitoring the progress in performing the plurality of printers 3 that uses the portable terminal apparatus. A specific example of the mode for display will be below.

4.1 List Display of Pieces of Information on a Plurality of Printers

IN a case where various pieces of information as illustrated in FIG. 9, because the display unit 933 of the portable terminal apparatus is small, for example, a display target needs to be limited to one printer 3 per one screen. If the number of printers 3 that are displayed on one screen is limited to 1, it is possible that status information, ink information, remaining-time information, and the like are collectively displayed. However, in a case where a certain user sets a plurality of printers 3 to be management targets, it is also considered that the certain user makes a request to know a statue of a give printer 3 and a status of another printer 3 at the same time. In a case where there is one printer 3 that is a target for display on one screen, in order to know pieces of information on the plurality of printers 3, there is a need to repeat screen transitioning, and this causes a troublesome interface.

The server system 7 according to the present embodiment is a server system 7 that collects the operation information on at least one printer 3 through the networks NE1 and NE2, and, as illustrated in FIG. 4, includes the communication unit 731 that receives the operation information on the printer 3, and the processor 71 that performs processing which causes a display screen, which is based on the operation information, to be displayed on the portable terminal apparatus (the terminal apparatus 9) that is connected through the network NE2. Then, the processor 71 of the server system 7 performs processing that causes the display screen, within one screen of which pieces of information that are the remaining times to the completion of the printing by a plurality of printers 3, or pieces of printing completion time information on the plurality of printers 3 are arranged, to be displayed on the display unit 933 of the portable terminal apparatus.

At this point, the pieces of information that are the remaining times to the completion of the printing by the plurality of printers 3 are a plurality of pieces of remaining-time information on the plurality of printers 3, and, in a narrow senses, indicate pieces of remaining-time information on printers 3, respectively, among the plurality of printers 3. For example, in the present embodiment, the processor 71 performs processing that causes, a display screen, within one screen of which first remaining-time information on a first printer and second remaining-time information on a second printer are arranged, to be displayed on the display unit 933 of the portable terminal apparatus. However, in the present embodiment, pieces of remaining-time information on all printers 3, among the plurality of printers 3, pieces of operation information on which are displayed, do not need to be displayed. For example, as will be described below with reference to FIG. 11, an embodiment is possible in which pieces of remaining-time information on one or several printers 3 ("Printer-0001" and "Printer-0002"), among the plurality of printers 3, are displayed side by side, and in which pieces of remaining-time information on the other printers 3 ("Printer-0003") are not displayed. Furthermore, an embodiment relating to the "pieces of printing completion time information" on the plurality of printers 3" are possible, as is the case with the remaining-time information.

At point, the "processing that causes the display" is processing that generates display screen information that is displayed on the display unit 933 of the portable terminal apparatus and transmits the display screen information to the portable terminal apparatus. Alternatively, processing that generates the display screen is performed in the processor 91 of the terminal apparatus 9, and the processor 71 of the server system 7 performs processing that transmits information necessary for the processing that generates the display screen, as the "processing that caused the display," which is described above.

For example, in a case where a request from the portable terminal apparatus is received, the processor 71 of the server system 7 associates pieces of identification information on a plurality of printers 3 and pieces of information, respectively, that are remaining times to the completion of the printing by the plurality of printers 3 with each other, and collectively transmits the resulting pieces of information to the portable terminal apparatus. Data that is transmitted from the server system 7, for example, is data in JavaScript Object Notation (JSON) (JavaScript is a registered trademark), Extensible Markup Language (XML), or the like. In the present embodiment, processing (generation processing of and transmission processing of JSON data or XML data, and processing) that collectively transmits pieces of operation information on a plurality of printers 3, which is performed by the server system 7, is also set to be included in "processing that causes the display screen, one screen of which piece of information on a plurality of printers 3 are arranged, to be displayed on the display unit 933 of the portable terminal apparatus."

Furthermore, the technique according to the present embodiment can apply to the portable terminal apparatus (the terminal apparatus 9). The portable terminal apparatus according to the present embodiment is a portable terminal apparatus that is communicatively connected through the network NE 2 to the server system 7 which collects the operation information on at least one printer 3, and, as illustrated in FIG. 5, includes the communication unit 931 that receives the operation information on the printer 3, the display unit 933 on which the operation information is displayed, and the processor 91 that performs control for the display on the display unit 933. The processor 91 of the portable terminal apparatus performs processing that displays the display screen, within one screen of which pieces of information that are the remaining times to the completion of the printing by a plurality of printers 3, or pieces of printing completion time information on the plurality of printers 3 are arranged.

Figure 10:
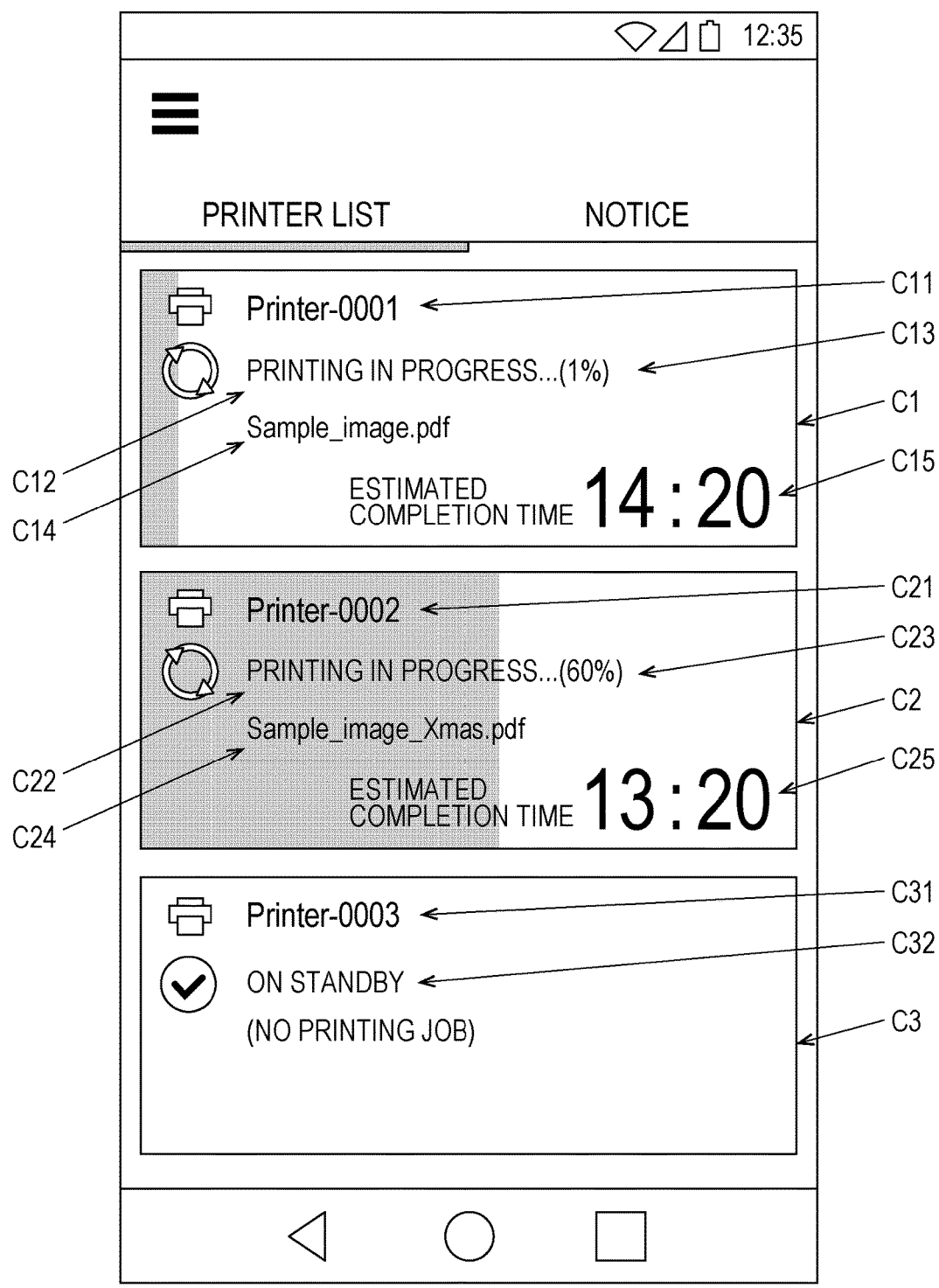
FIG. 10 is an example of a display screen on which pieces of information on the printer are list-displayed.

FIG. 10 is an example of the display screen that is displayed on the display unit 933 of the terminal apparatus 9. The processor 91 of the terminal apparatus 9 performs processing that causes the display screen, within one screen of which pieces of printing completion time information on a plurality of printers 3 are arranged, to be displayed on the display unit 933.

In the example in FIG. 10, pieces of information on three printers are displayed on the display unit 933. For example, along with "Printer-0001" (C11) that is a name of the printer 3, status information (C12) as the operation information, information (C13) on progress in performing a job, a job name (C14), and printing completion time information (C15) are displayed on an area that is indicated by C1. Specifically, a printer that has a name which is "Printer-0001" has a status that is "printing in progress," and performs a job that has a job name which is "Sample_image.pdf." At this point, the job name is a name of a file that is a printing target. Then, when the completion of the job is assumed to be 100%, progress is 1%, and the printing completion time is "14:20." It is noted that the display of the progress information is not limited a numerical value. For example, in FIG. 10, a background color of C1 is divided into a first background color and a second background color, and the information on the progress in performing the job is displayed at a ratio of the first background color to the entire width.

Furthermore, on an area that is indicated by C2, of the display unit 933, it is shown that a printer that has a name which is "Printer-0002" has a current status that is "printing in progress" and performs a job that has a job name (a printing target file name) which is "Sample_image_X-mas.pdf," that the progress in performing the job is "60%," and that the printing completion time is "13:20."

On an area that is indicated by C3, of the display unit 933, it is shown that a printer that has a name which is "Printer-0003" has a current status which is "being on standby" (an idle state). Because Printer-0003 is in the idle state, the job name, the information on the progress, and the printing completion time information are not displayed.

By using the display screen in FIG. 10, it is possible that operation states of a plurality of printers 3 are presented to the user in a more perspicuous manner. Particularly, because the printing completion time information is displayed, in a case where a plurality of printers 3 are display targets, the printing completion time is also easy to know. For example, on the display screen in FIG. 10, because the earliest printing completion time is easy to know, it is possible that the user is caused to determine that by that time, he/she has to return to a place where the printer 3 is installed and prepare for assignment of a next job.

Figure 11:
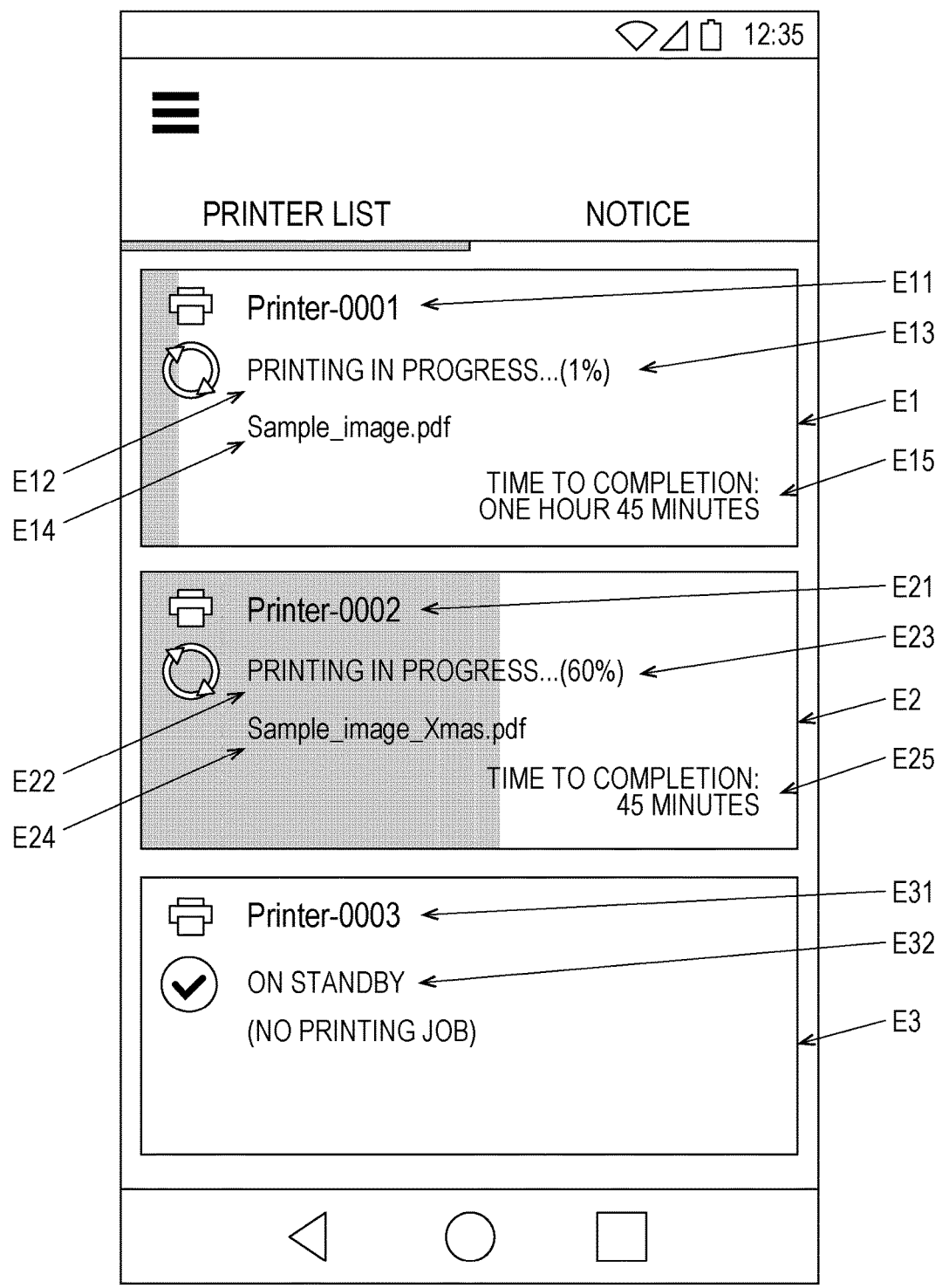
FIG. 11 is an example of the display screen on which the pieces of information on the printer are list-displayed.

FIG. 11 is another example of the display screen that is displayed on the display unit 933 of the terminal apparatus 9. The processor 91 of the terminal apparatus 9 performs processing that displays the display screen, within one screen of which pieces of information that are the remaining times to the completion of the printing by a plurality of printers 3 are arranged, on the display unit 933.

In the example in FIG. 11, in the same manner as in FIG. 10, pieces of information on three printers are displayed on the display unit 933. The remaining-time information (C15) on "Printer-0001" is displayed on C1 in FIG. 10, but information that is "one hour 45 minutes" which is the remaining time to the printing completion is displayed in the example in FIG. 11 (E15). E11 to E 14 of E1 are the same as C11 to C14 in FIG. 10, respectively. Furthermore, this is also true for "Printer-0002," and instead of the printing completion time information, information that is "45 minutes" which is the remaining-time information is displayed (E25).

It is noted that it is considered that the remaining time that is information does not decreases with the passage of time as long as any event (for example, flushing) that causes delay or advance in the printing progress does not occur on the printer 3 side. For this reason, in a case where, at the time 12:35 as illustrated in FIG. 11, the remaining-time information that is "one hour 45 minutes does not change with the passage of time, there is a concern that the user who performs browsing will feel uncomfortable.

The processor 91 (the terminal apparatus 9) of the portable terminal apparatus performs counting-down processing of the remaining time that is the information, based on the remaining-time information that is received by the communication unit 931 and on clocking information from a timer, and performs processing that displays the display screen, within one screen of which pieces of remaining-time information on a plurality of printers, which results after the counting-down processing are performed on a plurality of printers, are arranged. It is noted that the counter-down processing does not need to be performed on all printers 3 as targets and that, as is the case with "Printer-0003" in FIG. 11, the printer 3 that does not undergo the counting-down process may be present. The terminal apparatus 9 includes a timer such as a real time clock, and the processor 91 performs the counting-down processing based on the clocking information (time information) from the real time clock. It is noted that the clocking information here is not limited to information indicating an absolute time, and may be other information (for example, a time stamp) or the like that possibly results from measuring the time. Alternatively, the processor 91 may acquire the clocking information from the network NE2 (the Internet in a narrow sense) through the communication unit 931, and may perform the counting-down processing based on the clocking information. That is, the timer here may be included in the terminal apparatus 9 and may be included in external equipment.

When this is done, because the remaining-time information changes with the passage of time, the display that causes the user to feel less uncomfortable is possible. Furthermore, when the remaining-time information is updated, because there is no need to receive the remaining-time information from the server system 7 each time, a communication load can be reduced.

Furthermore, with reference to FIG. 10 or 11, the technique is described that arranges on the one screen the pieces of time information (the remaining-time information and the printing completion time information) relating to the completion of the printing by a plurality of printers 3, and the information that is the name of the job that is being performed. However, as illustrated in FIG. 9, the terminal apparatus 9 possibly receives other pieces of operation information from the server system 7 and also possibly list-displays these pieces of information.

Figure 12:
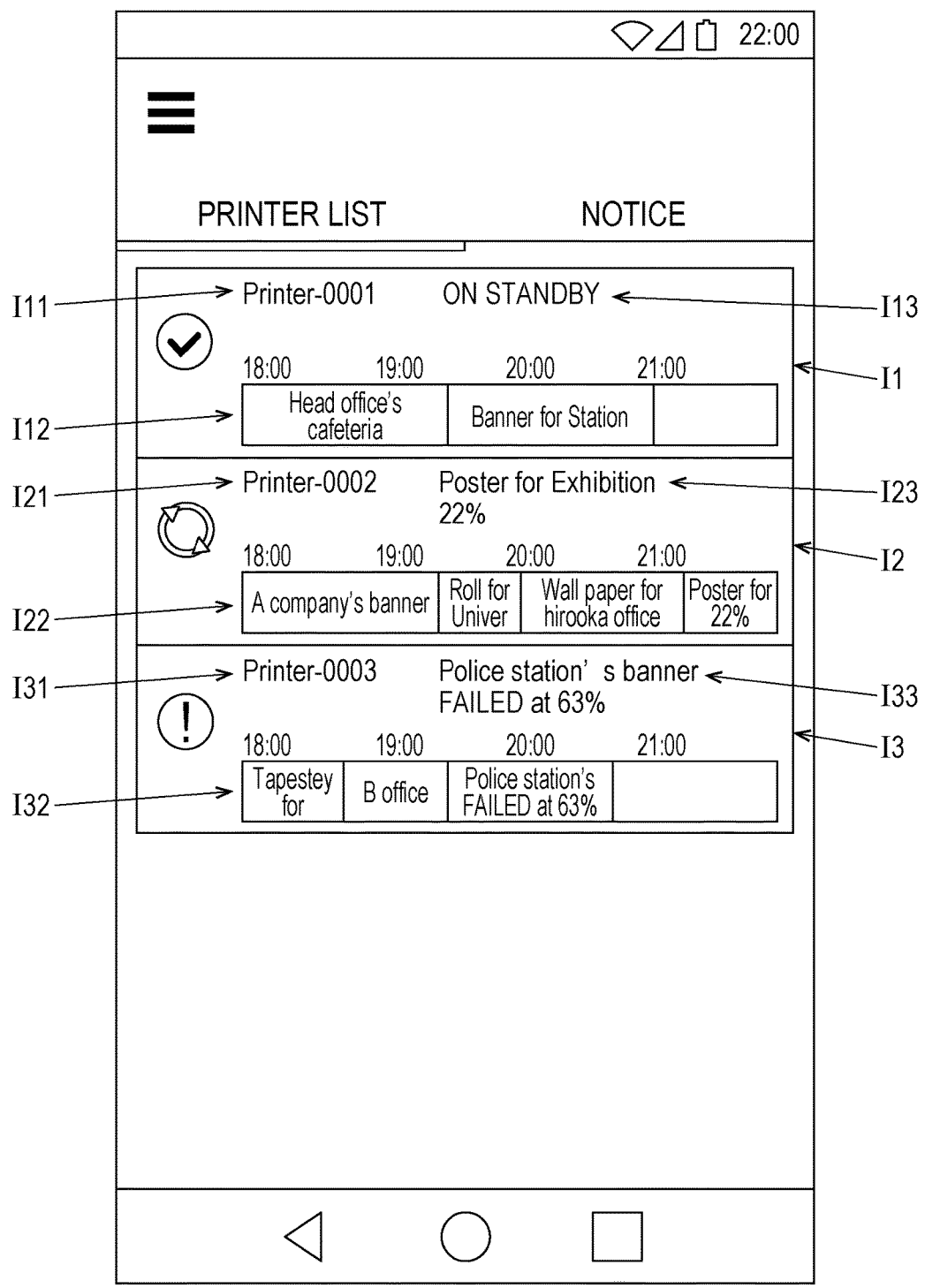
FIG. 12 is an example of the display screen on which the pieces of information on the printer are list-displayed.

FIG. 12 is another example of the display screen that is displayed on the display unit 933 of the terminal apparatus 9. The processor 71 of the server system 7 performs processing that causes the display screen, within one screen of which pieces of job history information on a plurality of printers 3 are arranged, to be displayed on the display unit 933 of the portable terminal apparatus. The job history information is information indicating on a job that is performed by the printer 3, and for example, is information that is a name of a job that is performed a prescribed past period of time or is information that is names of jobs of which the number is prescribed, which were performed in the past. It is noted that the job history information includes information on a job that is currently being performed.

In the example in FIG. 12, pieces of history information on jobs that are performed for the past 4 hours by three printers 3 (Printer-0001 to Printer-0003) are displayed on the display unit 933. It is noted that the time that is a display target may be shorter or longer than 4 hours. Furthermore, the time that is the display target may be recent time (which is a time span of which the end is a current time, and for example, is a time span from a time that is four hours earlier to a current time), or may be any time in the past.

Along with "Printer-0001" (I11) that is a name of the printer 3, history information on a job that is performed by "Printer-0001" for a period of time from 18:00 to 22:00 is displayed on an area that is indicated by I1, of the display unit 933 using a bar (I12). The vertical direction of I12 indicates time, and text information indicating a job is displayed on the bar. From the display of I12, it is apparent that "Printer-0001" performs a job that has a name which is "Head office's cafeteria," for a period of time for 18:00 to 19:30 and performs a job that has a name which is "Banner for Station," for a period of time from 19:30 to 21:00. Furthermore, in the example in FIG. 12, because for a period of time from 21:00 to 22:00, "Printer-0001" is in an idle state where a job is not performed, text indicating a job name is not displayed. Furthermore, status information that is "being on standby" is displayed, as current operation information on "Printer-0001," on the display unit 933 (I13).

In the same manner, along with "Printer-0002" (I21) that is a name of the printer 3, the history information on a job that is performed by "Printer-0002" for a period of time from 18:00 to 22:00 is displayed on an area that is indicated by I2, of the display unit 933, using the bar (I22). From the display of I22, it is apparent that "Printer-0002" completes the performance of three jobs for a period of time from 18:00 to 21:20 and is performing a job that has a name which is "Poster for Exhibition," from 21:20 until now, and that progress in performing the job is "22%." Furthermore, a name of the job that is being performed and information on progress are displayed as current operation information on "Printer-0002" (I23). It is noted that, in a case where recent history information is displayed, the details that are displayed on the left end of I22 and the details that are displayed on I23 are the same. However, in some cases, due to restricted space, a portion of the job name is also omitted on the bar display such as I22 in FIG. 12.

Furthermore, along with "Printer-0003" (I31) that is a name of the printer 3, the history information on the job that is performed by "Printer-0003" for a period of time from 18:00 to 22:00 is displayed on an area that is indicated by I3, of the display unit 933 using a bar (I32). "Printer-0003" normally completes a job that is scheduled to complete until 19:30, but the printing operation is interrupted due to an error that occurs at the time 20:45 with progress being 63%, while a job that has a name which is "Police station's banner," which started at 19:30, is being performed. Consequently, on I32 in FIG. 12, the name (actually, a portion of the name) that has "Police station's banner," is displayed on the bar display, showing that the interruption occurs with the progress being 63%. Furthermore, in the example in FIG. 12, after the interruption due to the error, recovery from the error or assignment of a new job is not performed on "Printer-0003." For this reason, the name of the job that was being performed when the interruption occurred due to the error and the information "63%" on the progress at the time of the interruption are displayed as current operation information on Printer-0003 (I33).

As is also understood from FIG. 12, in the present embodiment, a situation is assumed in which a certain user is in charge of a plurality of printers 3 and in which each of the printers 3 is caused to perform many jobs. Furthermore, it is considered that there are also various types of jobs, and a printing medium (a paper sheet, a piece of cloth, a transparent film, or the like), a commodity (a poster, a T-shirt, or the like), a company that is a delivery destination, and the like differ from one job to another. More precisely, it is considered that the user desires to browse through information as to whether many and various jobs are performed in each printer 3 without any problem, or information as to which job is stopped at what degree of progress when a problem occurs. In this case, as illustrated in FIG. 10 or 11, only with the display of the name of the job that is currently being performed, it is not easy to know how much progress has been made. Furthermore, because a plurality of printers 3 perform jobs in conjunction with each other (for example, a case where a commodity that is to be delivered to a given company is produced using a plurality of printers 3), in most cases, only a portion of the information that is desired by the user cannot be presented with the display of the history information on one printer 3.

In this respect, by displaying the screen as illustrated in FIG. 12, it is possible that states of many jobs are presented to the user in a more perspicuous manner. In FIG. 12, the history information on the job in the past, which is not illustrated in FIG. 10 or 11, can be presented to the user. Furthermore, when pieces of history information on a plurality of printers 3 are browsed through, the user does not have to switch between screens and so forth.

It is noted that in a list display of the job history information, a display mode for each job may be changed according to a type of job or a state of progress. For example, the processor 91 changes a background color of the bar according to the printing medium, the commodity, and the company that is a delivery destination, which are described above, and the like. Alternatively, the processor 91 changes the background color of the bar according to a job in which the printing is normally completed, a job in which the printing is in progress, and a job in which the printing is interrupted due to an error. When this is done, in a case where pieces of information on many jobs are displayed, it is possible that the display is performed in a manner that visually helps with easy understanding.

Figure 13:
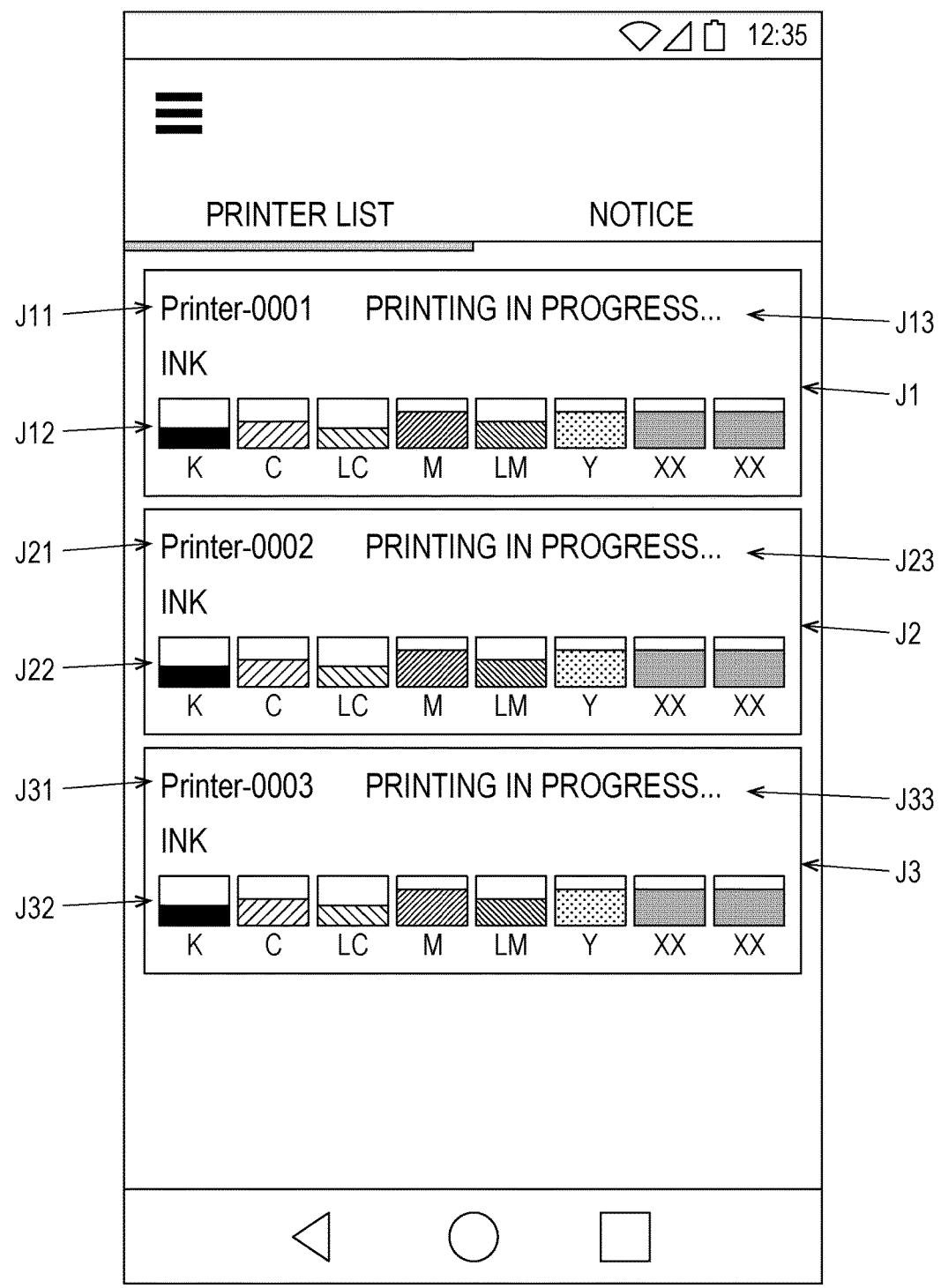
FIG. 13 is an example of the display screen on which the pieces of information on the printer are list-displayed.

FIG. 13 is another example of the display screen that is displayed on the display unit 933 of the terminal apparatus 9. The processor 71 of the server system 7 performs processing that causes the display screen, within one screen of which pieces of ink information on a plurality of printers 3 are arranged, to be displayed on the display unit 933 of the portable terminal apparatus.

In the example in FIG. 13, remaining amounts of ink in three printers 3 (Printer-0001 to Printer-0003) are displayed on the display unit 933 using bar graphs (image information, of which a length in the vertical direction changes according to a remaining amount) for colors.

"Printer-0001" (J11) that is a name of the printer 3, a remaining amount of ink for each color (J12), and status information (J13) that is "printing in progress," which is current operation information are displayed on an area that is indicated by J1, of the display unit 933. This is true for other printers 3 (J2 and J3).

By displaying the screen as in FIG. 13, it is possible that pieces of information (information that is the remaining amount or used-amount information) on a plurality of printers 3 are presented to the user in a more perspicuous manner. Furthermore, when pieces of ink information on a plurality of printers 3 are browsed through, the user does not have to switch between screens and so forth.

4.2 Display that Results when an Event Occurs

Furthermore, various events occur in the printer 3. In the case of the example that is illustrated in FIG. 9, a change in status information (starting of printing, ending of printing, occurrence of an error, or occurrence of a warning), a change in remaining-time information, a change in a remaining amount of ink, or the like is considered as an example of the event. Furthermore, an event associated with the first information is given as an example in FIG. 9, but it is also possible that an event associated with the second information is used. In either case, in a case where an event occurs, it is considered that more changes in the operation state of the printer 3 occur than when the event occurs. Consequently, the processor 71 of the server system 7 performs processing that causes a display mode for the printer 3 in which an event occurs to change to a display mode that is different from display modes for other printers 3.

When this is done, it is possible that the occurrence of an event in the printer 3 or the detail or the like of the event that occurs is reported to the user using the display unit 933 of the terminal apparatus 9.

Specifically, the event here is an event in which an error or a warning occurs in the printer 3. As described above, the event in which an error or a warning occurs (a change of status information to "error," or "warning") is an event indicating that the printing operation is interrupted in the printer 3 or that there is a concern that the printing operation will be interrupted, and in most cases, the user needs to take corrective action in order to continue a normal printing operation. More precisely, by changing the display mode for the printer 3 in which the event in which an error or a warning occurs is detected, it is possible that the error or the warning is reported to the user in a manner that is easy to understand and is urged to take suitable corrective action.

In a case where the event in which an error occurs is detected, the processor 71 performs processing that causes information specifying a time for interruption of a printing operation by the printer 3 due to the error to be displayed on the display unit 933 of the portable terminal apparatus. Furthermore, in the case where which an error occurs is detected, the processor 71 performs processing that causes at least one of information specifying a job at the time of the occurrence of the error and information on progress in performing the job at the time of the occurrence of the error occurs to be displayed on the display unit 933 of the portable terminal apparatus. It is noted that, as described with reference with FIG. 8 or 9, the printer 3 or the information processing apparatus 5 performs transmission of information (the first information) to the server system 7, which is triggered by the occurrence of the event, using MQTT. In this case, if the server system 7 receives the information by performing the first communication processing (MQTT) and the received information is information relating to the error, the server system 7 determines that the event in which the error occurs is detected.

Figure 14:
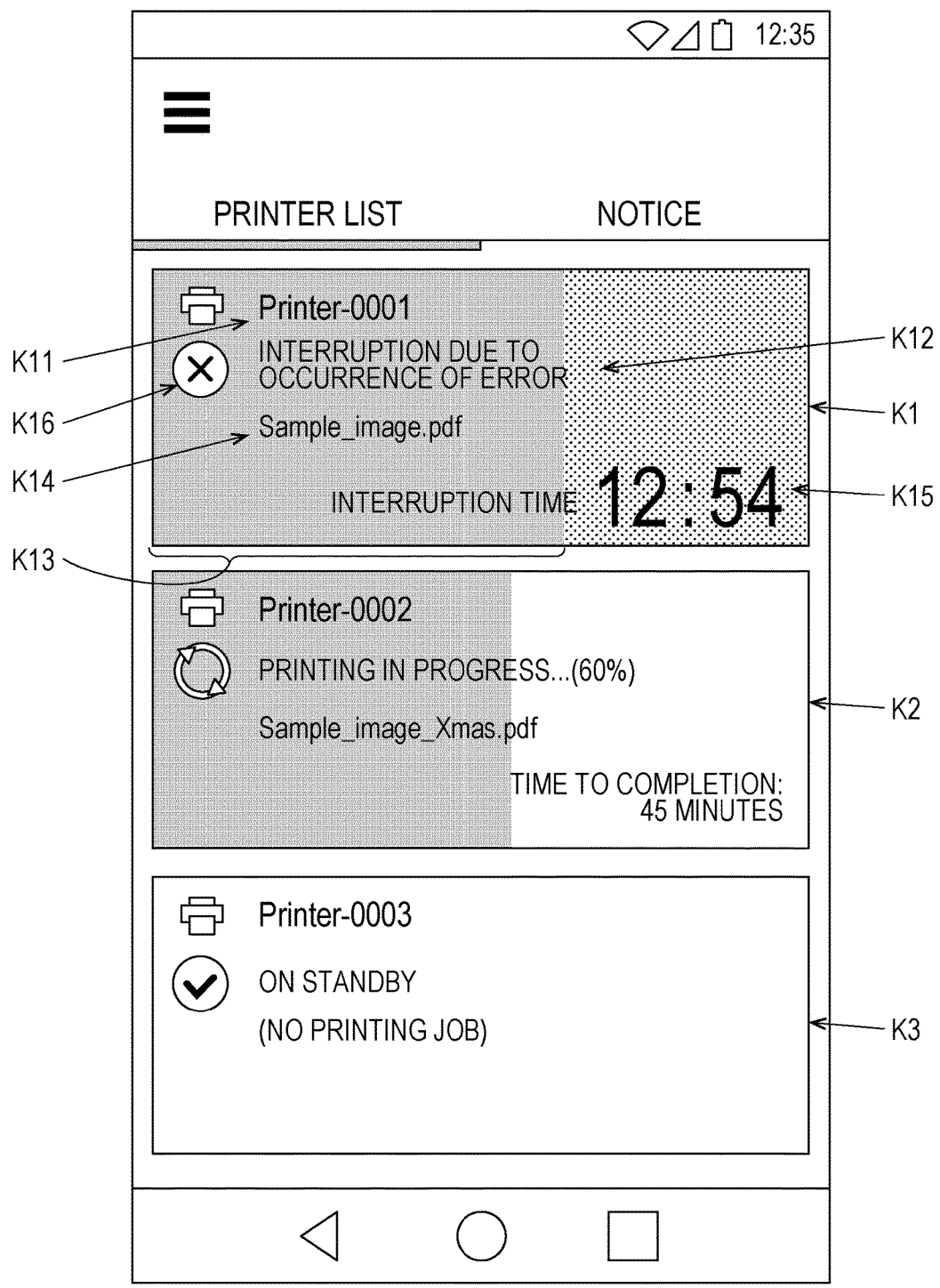
FIG. 14 is an example of the display screen at the time of occurrence of an error.

FIG. 14 is an example of the display screen that is displayed on the display unit 933 of the terminal apparatus 9 in a case where the event in which the error occurs is detected. In FIG. 14, the example in which the error occurs in "Printer-0001" is illustrated, displays (K2 and K3) relating to "Printer-0002" and "Printer-0003" are the same as E2 and E3, respectively, in FIG. 11. Thus, descriptions thereof are omitted.

In the example in FIG. 14, "Printer-0001" (K11) that is a name of the printer 3, status information (K12), a job name (K14) at the time of the occurrence of the error, and a time (K15) for interruption of the printing operation due to the error are displayed on an area that is indicated by K1. Along with this, a background color of the area that is indicated by K1 is caused to change to a third color background color and a fourth background color that are different from the background colors (for example, the first background color and the second background color that are used in "Printer-0002") in the printer 3 in which an error does not occur. When this is done, with the difference in background color, a status of each printer 3, particularly, whether or not an error occurs is possibly indicated clearly. Furthermore, in the example in FIG. 14, the occurrence of the error is clearly indicated by displaying an icon (K16) representing a x stamp.

Moreover, a name (K14) of a job at the time of the occurrence of an error, information (a ratio of an area K13 in the third background color to the entire K1) on progress in performing the job at the time of the occurrence of the error, and a time (K15) of the occurrence of the error are displayed on the display unit 933. For this reason, it is possible that when an error occurs, in which job the error occurs, and how much progress has been made in the job are clearly indicated. Because a specific detail of the error can be presented to the user, it is possible that suitable corrective action is taken to deal with the error.

If the job name is known, the user possibly specifies the job that has to be restarted. Furthermore, if the time for the interruption of the printing operation is known, it is possible that the user estimates to what degree the job which he/she manages is delayed. In a case where the degree of the delay is high, it is also possible that a countermeasure is taken such as to postpone a job that has low priority until after the next day or to advance to enable a job that has high priority has a high precedence in performance.

It is noted that it is also considered that the printing is performed on a printing medium that is 100 m long and then that the printing medium is cut into lengths of 10 m for shipping as commodities. In this case, although the printing is interrupted in a state where the progress has been made to a length of 65 m (65%), a product that is 60 m as long is possibly used as manufactured goods. If the printing is performed on the remainder of the printing material that is 40 m long, this is sufficient. The information on the progress in performing the job at the time of the occurrence of the error is displayed as illustrated in FIG. 14, and thus, it is possible that the user takes corrective action in a flexible manner. It is noted that in FIG. 14, the information on the progress is displayed using a ratio of an area (K13) in the third background color to the entire K1, but as illustrated in FIG. 10 and other figures, the information on the progress may be displayed using a numerical value. Furthermore, I32 or I33 in FIG. 12 are also an example of displaying the information (63%) on the progress in performing the job at the time of the occurrence of the error.

Figure 15:
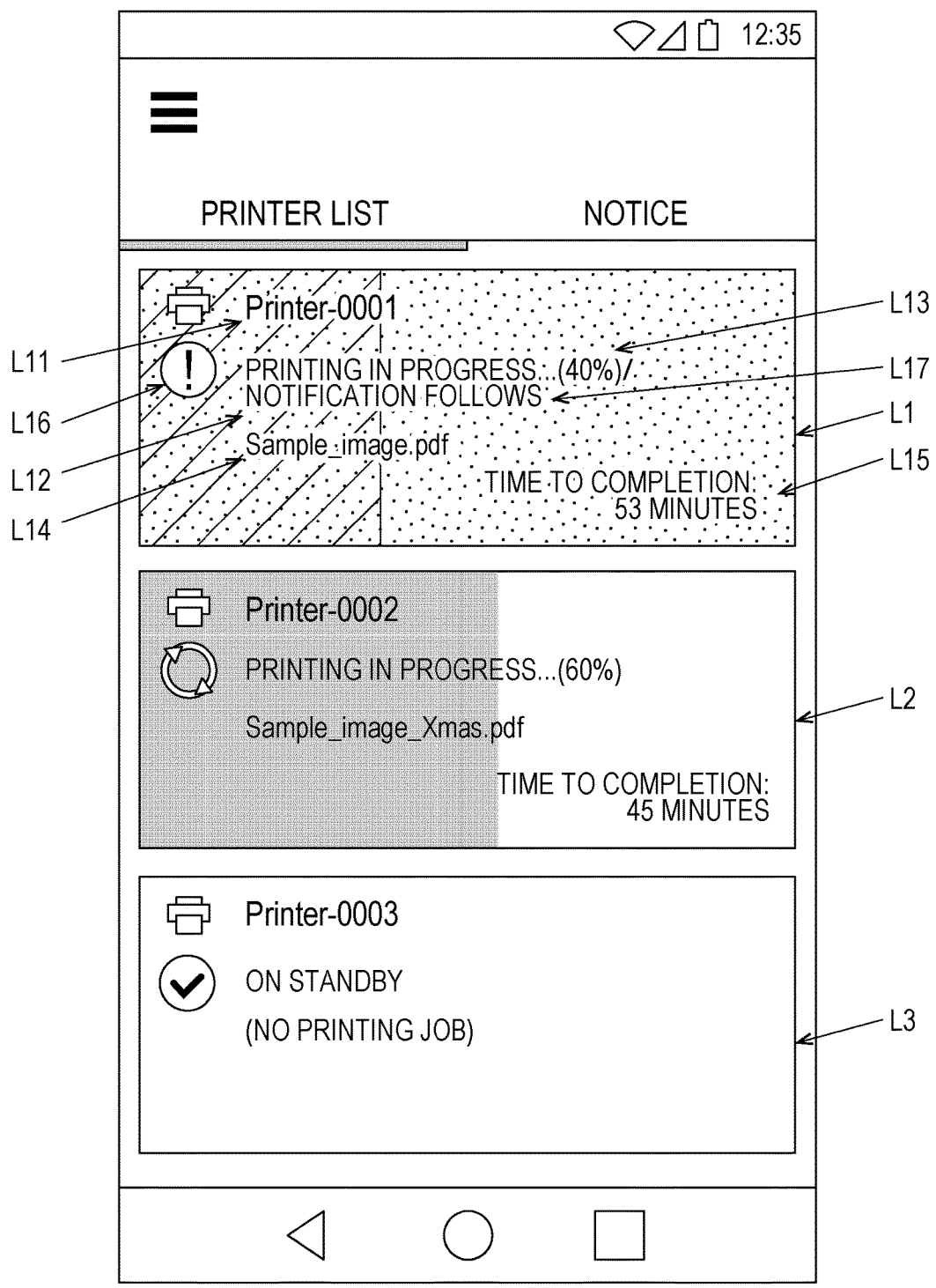
FIG. 15 is an example of the display screen at the time of occurrence of a warning.

FIG. 15 is an example of the display screen that is displayed on the display unit 933 of the terminal apparatus 9 in a case where an event in which a warning occurs is detected. In a warning state, the printing operation itself continues. Consequently, in the same manner as E11 to E15 in FIG. 11, a name (L11) of the printer 3, status information (L12), information on progress in performing a job (L13), a job name (L14), and remaining-time information (L15) are displayed on an area that is indicated by L1.

Figure 19:
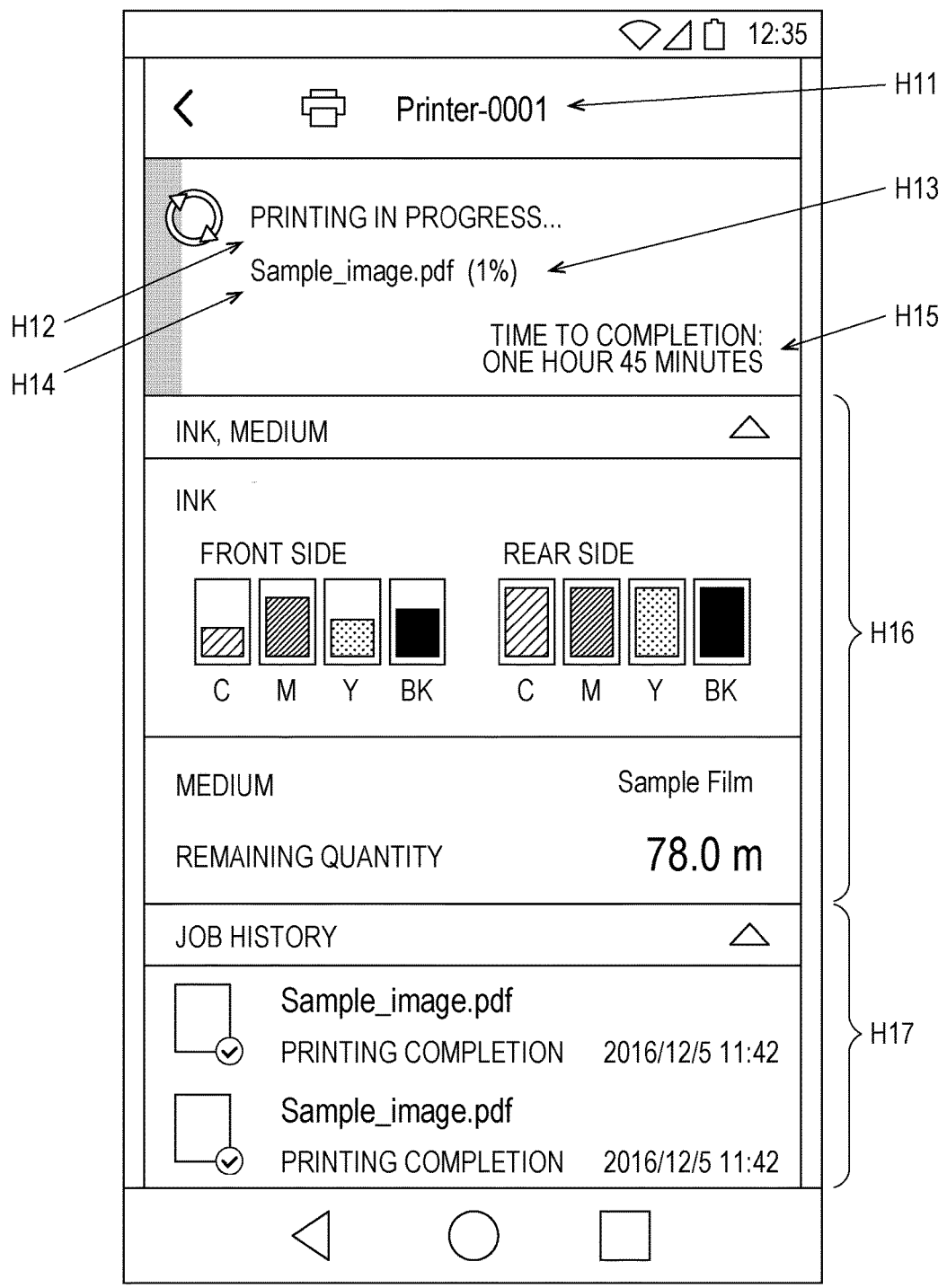
FIG. 19 is an example of the display screen for detail information.

However, because it is clearly indicated that the event in which the warning occurs is detected, a background color of the area that is indicated by L1 is caused to change to a fifth background color and a sixth background color that are different from any one of the background colors (the first background color and the second background color) in a normal state and the background colors (the third background color and the fourth background color) in the case where the event in which the error occurs is detected. Furthermore, the occurrence of the warning is clearly indicated by displaying an icon (L16) representing an exclamation mark ("!"). Moreover, in FIG. 15, the occurrence of the warning can be clearly indicated by displaying text information that is "notification follows" (L17). Based on the display of L16 or L17, in a case where the user performs an operation of selecting "Printer-0001," the detail of the warning is specifically displayed on the display unit 933. For example, a display screen for detail information that will be described below with reference with FIG. 19 is displayed on the display unit 933.

In list displays in FIGS. 10 to 15, an example is described in which display areas for the printers 3 (for example, sizes of C1, C2, and C3) are the same. The processor 71 of the server system 7 may perform processing that causes a display area for the first printer and a display area for the second printer that is different from the first printer, among a plurality of printers 3, to be displayed in different sizes on the display unit 933 of the portable terminal apparatus.

Figure 16:
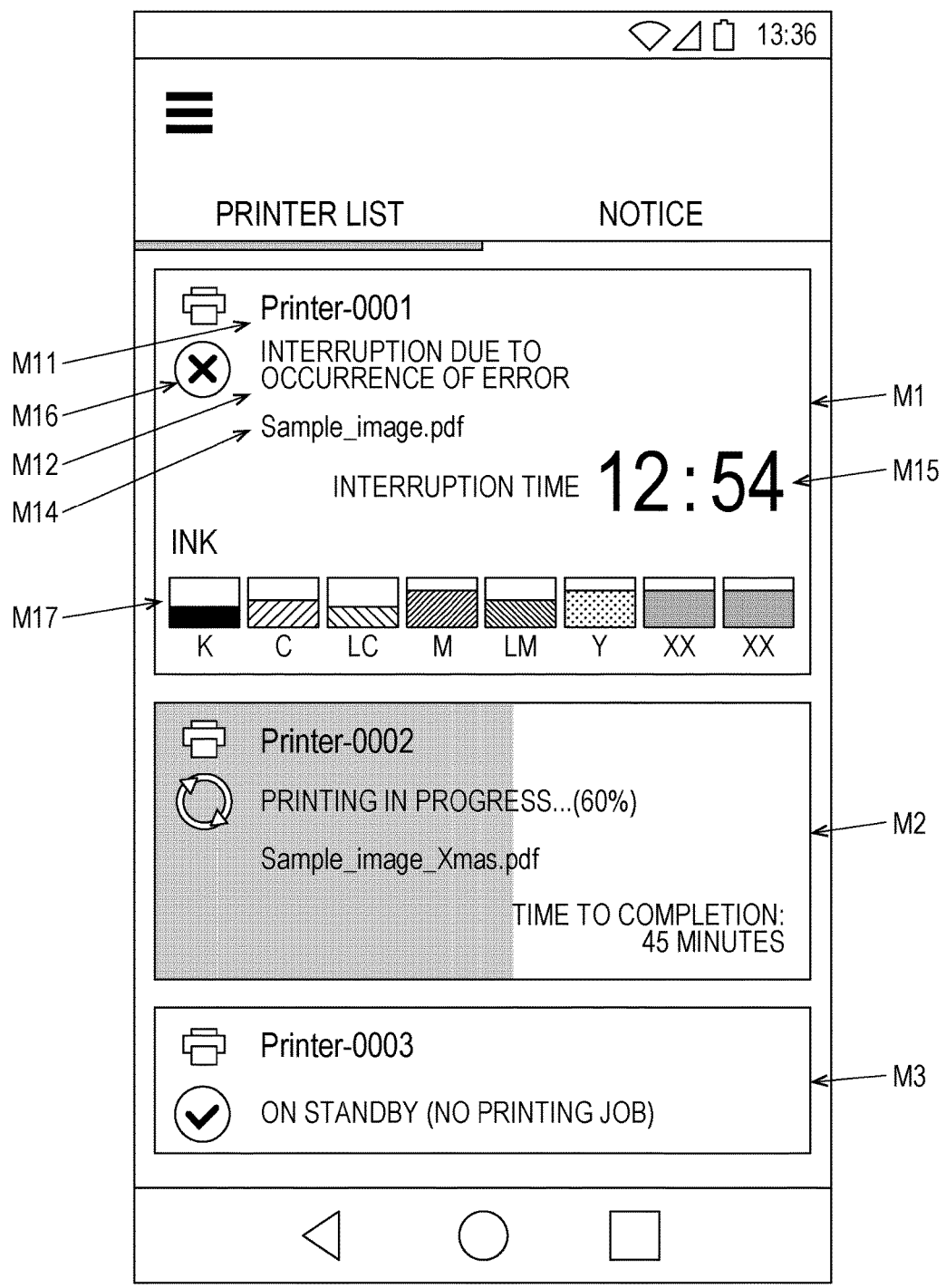
FIG. 16 is another example of the display screen at the time of the occurrence of the error.

FIG. 16 is another example of the display screen that is displayed on the display unit 933 of the terminal apparatus 9 in a case where the event in which the error occurs is detected. In the same manner as K1 in FIG. 16, M1 in FIG. 14 is an area on which information associated with "Printer-0001" is displayed. In addition to pieces of information (M11 to M16) that correspond to K11 to K16, respectively, information on the remaining amount of ink (M17) is displayed on an area that is indicated by M1. Because of this, a size of an area M1 is greater than K1.

A size of an area M2 on which information associated with "Printer-0002" that is in a normal state (is printing) is displayed is the same as that of K2 in FIG. 14. More precisely, the processor 71 of the server system 7 performs processing that causes a display area (M1) for the printer 3 in which an error occurs to be displayed in a larger size than a display area (M2) for the printer 3 in which an error does not occur.

When this is done, because a display area for information relating to the printer 3 in which an abnormality such as an error occurs can be increased, it is possible that an amount of information that is displayed on the area is increased. In the example in FIG. 16, which is M1, information on the remaining amount of ink is added when compared with K1 in FIG. 14. However, while an amount of information that is displayed is maintained, a font size may be increased. In this case, the amount of information itself is not increased, but it is possible that visibility of the information that is displayed is increased.

Furthermore, in the same manner as K3 in FIG. 14, M3 in FIG. 16 is an area on which information associated with "Printer-0003" is displayed, but a size of an area M3 is smaller than that of K3. More precisely, the processor 71 of the server system 7 performs processing that causes a display area (M3) for the printer 3 on standby to be displayed in a smaller size than a display area (M2) for the printer 3 that is performing a job. At this point, the printer 3 on standby is a printer 3 in which interruption due to an error or the like does not occur, but does not perform the printing operation because a job is not assigned, and corresponds to "Printer-0003" in the example in FIG. 16.

In this manner, by changing the display area according to whether the printer is performing printing or is on standby, it is possible that a relatively wide display area is allocated to the printer 3 that has a large amount of information which has to be presented. In the example in FIG. 16, a job name, information on progress, and remaining-time information need to be displayed for the printer 3 that is performing printing, but the printer 3 on standby does not need the display of these. Because of this, an efficient arrangement of pieces of information is possible by setting a size of a display area to be M2>M3.

It is noted that in FIG. 16, the example is illustrated in which the processor 71 performs both the processing which causes the display area (M1) for the printer 3 in which an error occurs to be displayed in a greater size than the display area (M2) for the printer 3 in which the error does not occur, and the processing that causes the display area (M3) for the printer 3 on standby to be displayed in a smaller size than the display area (M2) for the printer 3 that is performing a job. However, the present embodiment is not limited to this. One of the processing operations may be performed. Both of the processing operations, as illustrated in FIG. 10 and other figures, may not be performed.

It is noted that, in a case where an abnormality such as an error or a warning occurs in the printer 3, it is desirable that the occurrence of the event is notified to the user as rapidly as possible and that the user is urged to take corrective action. Specifically, processing that changes the display mode in the display unit 933 of the terminal apparatus 9, which is described with reference to FIGS. 14 to 16, has to be performed as rapidly as possible after the occurrence of the event.

Consequently, in a case where the occurrence of the event described above is detected in the printer 3, the processor 71 of the server system 7 performs processing that makes the push notification of an instruction to update the display screen to the portable terminal apparatus. The push notification here is one that reports the occurrence of the event, and specific information (the status information, the job name, the time for the interruption of the printing operation, or the like) for display on the display screen is transmitted along a path that is illustrated in B2 in FIG. 8. That is, in a case where in response to the push notification, a request is transmitted from the portable terminal apparatus side, the server system 7 performs that replies with a response and thus causes suitable information to be displayed on the display unit 933 of the portable terminal apparatus.

4.3 Modification Examples

Several modification examples will be described below.

In a case where the server system 7 collects pieces of operation information on the printers 3 that a plurality of companies that include a company A and a company B retain, for the purpose of security, it is improper for a user who is an employee of the company A to be allowed to browse through the operation information on the printer 3 of the company B. Consequently, among the printers 3, pieces of operation information on which the server system 7 collects, the server system 7 transmits only the operation information on a prescribed printer 3 to the terminal apparatus 9. Specifically, the printer 3 (hereinafter referred to as a display candidate printer) that is a candidate for a display target in the terminal apparatus 9 of an employee of the company A is the printer 3 that is retained by the company A.

Moreover, a case where a target for management by a user who is an employee of the company A is among the printers 3 that are retained by the company A is also considered. In such a case, if pieces of operation information on all printers 3 that are retained by the company A are transmitted to the user, this is not desirable because even information that is less important for the user is a display target.

For this reason, the server system 7 (the memory 75) has a database that results from associating a portable terminal apparatus, and a plurality of printers 3, pieces of operation information on which are targets for display in the portable terminal apparatus with each other, and the processor 71 performs processing that updates the database based on setting information that is received from the portable terminal apparatus.

Figure 17:
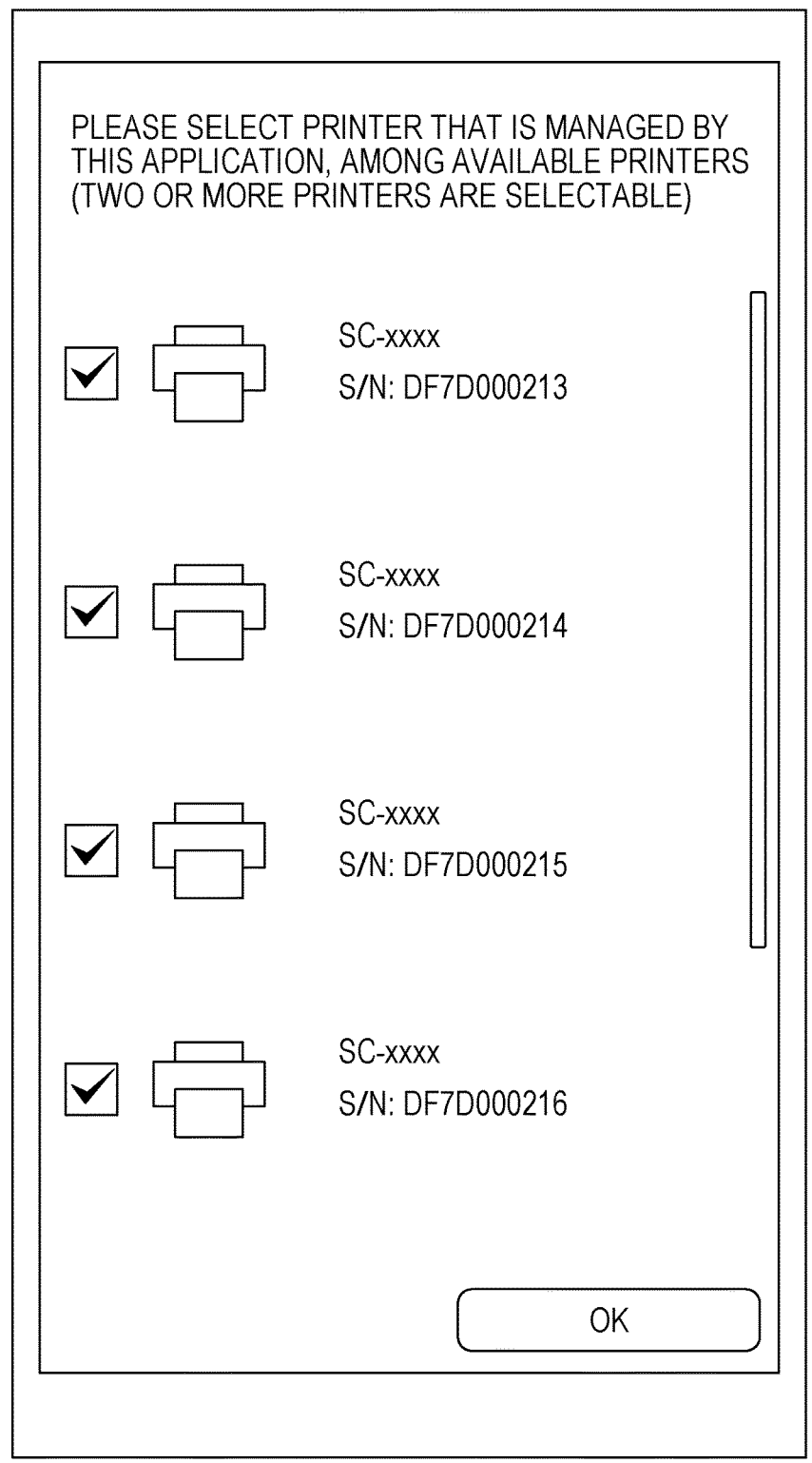
FIG. 17 is an example of the display screen that is used for setting of a display target.

FIG. 17 is an example of a screen that is displayed on the display unit 933 of the terminal apparatus 9 when the setting information is input. As illustrated in FIG. 17, the processor 91 of the terminal apparatus 9 receives information on the display candidate printer from the server system 7, and performs processing that displays the received information (a serial number, a name, or the lie) on the display candidate printer and a check box side by side.

The user marks the check box for the printer 3 that is desired to be set as a display target, and pushes down an OK button. Based on the user operation, among display candidate printers, the communication unit 731 of the server system 7 receives, as the setting information, information that specifies the printer 3 that is selected as the target for display on the terminal apparatus 9, from the terminal apparatus 9 (the communication unit 931).

When this is done, it is possible that the information on the printer 3 that is set as the target for display on the terminal apparatus 9 is suitably managed in the server system 7 and that the user is caused to select the printer 3 that is set as the display target, from among the display candidate printers.

Furthermore, it is considered that a company that causes the printer 3 to operate conducts business according to a procedure in which printing data (for example, image data such as "Sample_image.pdf" in FIG. 10 and other figures) is drawn from a client company, in which the printing data is printed on a printing medium, and in which a product is delivered to the client company. In this example, there is also a likelihood that a contract in which the printing data should not be divulged to the third party will be made and then that the printing data will be drawn from the client company. Depending on the situation, a file name itself is confidential information, and thus is not permitted to be divulged to the third party.

In the operation information collection system that is illustrated in FIG. 1, the printer 3, the information processing apparatus 5, and the terminal apparatus 9 are equipment that is possibly managed by the company which causes the printer 3 to operate, but the server system 7 is not limited to being managed by the company that causes the printer 3 to operate. Rather, it is assumed that management of the server system 7 is performed by the third party that is different from the company that causes the printer 3 to operate and also from the client company. In such a case, the selection of the file name such as "Sample_image.pdf" as the information on the job name by the server system 7 cannot be said to be suitable from the perspective of security protection.

Figure 18:
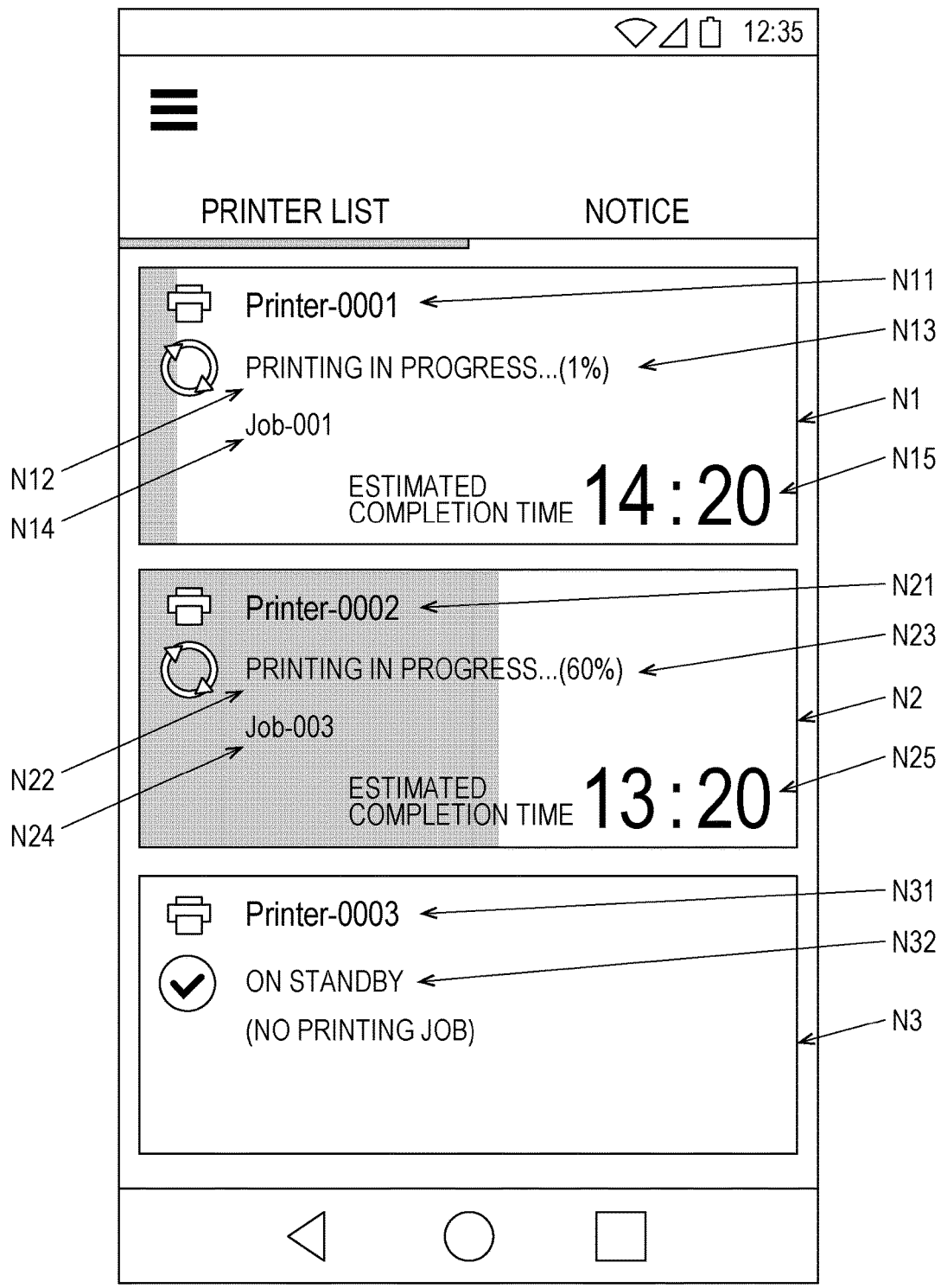
FIG. 18 is an example of the display screen on which information that substitutes for a name of a file is displayed.

FIG. 18 is another example of the screen that is displayed on the display unit 933 of the terminal apparatus 9. In the case of a first display setting, as illustrated in FIG. 10, the processor 71 of the server system 7 performs processing that causes a name (C14) of a file that is being printed to be displayed on the display unit 933 of the portable terminal apparatus. In the case of a second display setting that is different from the first display setting, as illustrated in FIG. 18, the processor 71 performs processing that causes information (N14), which substitutes for the file name, to be displayed on the display unit 933 of the portable terminal apparatus. The first display setting is a setting in which the collection of and the display processing of the file name is approved, and the second display setting is a setting in which the collection of and the display processing of the file name is not approved.

In the example in FIG. 18, serial number information such as "Job-001" is used as the information that substitutes for the file name. When this is done, in a case where a name of a file that is a printing target is not collected in the server system 7, it is also possible that suitable display is performed in the display unit 933 of the terminal apparatus 9. It is noted that the substitution information is not limited to the serial number information. For example, time information (a job starting time, a time for assignment of a job to the printer 3, or the like) relating to a job may be used as the substitution information.

It is possible that pieces of information on a plurality of printers 3 are displayed on the display screens in FIGS. 10 to 15 in a more perspicuous manner, but an amount of information for one printer 3 is limited. For example, in FIG. 10 or 11, information on the remaining amount of ink or history information on the job name are not the display targets. In FIG. 12 or 13, the display target is also limited to the history information on the job name and the ink information, and the remaining-time information and the like are not the display targets. An embodiment is also considered in which an amount of information relating to the printer 3 in which an error occurs is increased by changing a size of the display area as illustrated in FIG. 16, but an amount of information relating to the printer 3 that is performing printing or is on standby is limited.

Consequently, the processor 71 of the server system 7 performs processing that causes the display area for the selected printer 3 to be displayed in a greater size than the display area for the printer 3 that is not selected. In other words, in a case where any printer is selected from among a plurality of printers 3, pieces of remaining-time information or pieces of printing completion time information on which are displayed, the processor 91 of the terminal apparatus 9 (the portable terminal apparatus) performs processing that enlarges the display area for the printer on which a selection operation is performed and displays detail information.

FIG. 19 is an example of the display screen on which the detail information is displayed. FIG. 19 corresponds to the display screen in a case where, for example, in a state where the display in FIG. 11 is performed, the user performs an operation of selecting "Printer-0001." In addition to displays (H11 to H15) of pieces of information that correspond to E11 to E15, respectively, in FIG. 11, the processor 91 displays pieces of information (H16) that are a remaining amount of ink and a remaining quantity of media (paper sheets or pieces of cloth) and job history information (H17).

In this manner, by suitably switching between the more perspicuous display (FIG. 10 and other figures) and the detail display (FIG. 19), it is possible that suitable information is presented to the user. It is noted that the information which is displayed as the detail information is not limited to FIG. 19 and that various modifications are possible. Furthermore, the example in which the detail information is displayed on a screen that is different from that in FIG. 11 ("Printer-0002," or "Printer-0003" is not illustrated) is illustrated in FIG. 19, but different modifications are also possible. For example, it is also possible that, as illustrated in FIG. 11, the detail information is additionally displayed on a screen on which pieces of information on a plurality of printers 3 are displayed side by side. Specifically, in a case where "Printer-0001" is selected, display that is equivalent to H16 or H17 may be inserted between E1 and E2 in FIG. 11. In this case, although the detail information is being displayed, by performing a scrolling operation, it is possible that other pieces of information such as "Printer-0002" are browsed through.

Furthermore, as illustrated in FIG. 1, a technique according to the present embodiment can apply to the operation information collection system 1 that includes the server system 7 and the terminal apparatus 9.

Furthermore, one or several of or most of the processing operations by the server system 7, the terminal apparatus 9, or the like according to the present embodiment may be realized by a program. In this case, a processor such as a CPU executes the program, and thus the server system 7, the terminal apparatus 9 or the like according to the present embodiment is realized. Specifically, the program that is stored on a non-transitory information storage medium is read and the processor such as the CPU executes the program that is read. The information storage medium (computer-readable medium) here is one on which a program, data, or the like are stored, and a function thereof can be realized by an optical disk (a DVD, a CD, or the like), a hard disk driver (HDD), a memory (a card-type memory, a ROM, or the like), or the like. Then, the processor such as the CPU performs various processing operations according to the present embodiment based on the program (the data) that is stored in the information storage medium. That is, a program (a program that causes a computer to perform processing by each unit) for causing a computer (an apparatus that includes an operation unit, a processor, a memory, and an output unit) to function as each unit according to the present embodiment is stored in the information storage medium.

Furthermore, the server system 7, the terminal apparatus 9, or the like according to the present embodiment may include a processor and a memory. The processor here, for example, may realize a function of each unit in individual hardware, or may realize the function of each unit in integrated hardware. For example, the processor can include a piece of hardware, and the piece of hardware can include at least one of a circuit that processes a digital signal and a circuit that processes an analog signal. For example, the processor can be configured with one or more circuit devices (for example, an IC or the like) that is mounted on a circuit substrate, or with one or more circuit elements (for example, a resistor, a capacitor, or the like). The processor, for example, may be a CPU. However, the processor is not limited to the CPU, and it is possible that various processors such as a graphics processing unit (GPU) or a digital signal processor (DSP) are used. Furthermore, the processor may be a hardware circuit that is an ASIC. Furthermore, the processor may include an amplification circuit, a filter circuit, or the like that processes an analog signal. The memory may be a semiconductor memory such as a SRAM or a DRAM, may be a resistor, may be a magnetic storage device such as a hard disk device, and may be an optical storage device such as an optical disk. For example, a computer-readable instruction is stored in the memory, and execution of the instruction by the processor realizes a function of each unit (the communication unit or a processor) of the server system 7 or the terminal apparatus 9. The instruction here may be a command in an instruction set that makes up the program, and may be an instruction that instructs a hardware circuit of the processor to perform an operation.

Furthermore, the technique according to the present embodiment can apply to a method of operating a server system 7 that collects operation information on at least one printer 3 through a network, the method of operating the server system 7 that receives the operation information on the printer 3, performs display processing which causes a display screen that is based on the operation information to be displayed on a portable terminal apparatus that is connected through the network, and processing that causes the display screen, within one screen of which pieces of information that are remaining times to completion of printing by a plurality of printers 3 or pieces of printing completion time information on the plurality of printers 3 are arranged, to be displayed on a display unit 933 of the portable terminal apparatus.

Alternatively, the technique according to the present embodiment can apply to a method of operating a portable terminal apparatus that is communicatively connected to a server system 7 that collects operation information on at least one printer 3, through a network NE2, the method of operating the portable terminal apparatus that receives the operation information on the printer 3, performs control of display of the operation information, and performs processing that displays a display screen, within one screen of which pieces of information that are remaining times to completion of printing by a plurality of printers 3 or pieces of printing completion time information on the plurality of printers 3 are arranged.

The embodiments and the modification examples thereof to which the invention is applied are described above, but the invention is not limited to the embodiments and the modification examples thereof as are, and in the stage of implementation, for realization, a change can be made to a constituent element within the scope that does not depart from the gist of the invention. Furthermore, various inventions can be contemplated by suitably combining a plurality of constituent elements that are disclosed in each embodiment or the modification example thereof, which are described above. For example, among all constituent elements that are described in each embodiment or the modification example thereof, several constituent elements may be deleted. Moreover, the constituent elements that are described in the different embodiments and the modification examples thereof may be combined. Furthermore, in the specification or the drawings, the terms that are described at least once together with different terms that have broader meaning or the same meaning can be exchanged with the different terms, in any place of the specification or the drawings. In this manner, various modifications or applications are possible within the scope that does not depart from the gist of the invention.

The entire disclosure of Japanese Patent Application No: 2017-147921, filed Jul. 31, 2017 is expressly incorporated by reference herein in its entirety.

What is claimed is:

1. A server system that collects operation information on a printer through a network, the system comprising:
   a communication interface that receives the operation information on the printer; and
   a processor that causes a display screen that is based on the operation information, to be displayed on a portable terminal apparatus that is connected through the network,
   wherein the processor performs processing that causes the display screen, within one screen of which pieces of information that are remaining times to completion of printing by a plurality of the printers or pieces of printing completion time information on the plurality of the printers are arranged, to be displayed on a display unit of the portable terminal apparatus, and
   wherein the processor performs processing that causes a display area for a first printer and a display area for a second printer which is different from the first printer, among the plurality of the printers, to be displayed in different sizes on the display unit of the portable terminal apparatus.

2. The server system according to claim 1, wherein the processor performs processing that causes a display mode for the printer in which an event occurs to change to a display mode that is different from display modes for other printers.

3. The server system according to claim 2, wherein the event is an event in which an error or a warning occurs in the printer.

4. The server system according to claim 3, wherein, in a case where the event in which the error occurs is detected, the processor performs processing that causes information that specifies a time for interruption of a printing operation by the printer due to the error, to be displayed on the display unit of the portable terminal apparatus.

5. The server system according to claim 3, wherein, in a case where the event in which the error occurs is detected, the processor performs processing that causes at least one of information that specifies a job at the time of the occurrence of the error and information on progress in performing the job at the time of the occurrence of the error, to be displayed on the display unit of the portable terminal apparatus.

6. The server system according to claim 2, wherein, in a case where it is detected that the event occurs in the printer, the processor performs processing that makes push notification of an instruction to update the display screen to the portable terminal apparatus.

7. The server system according to claim 1, further comprising:
   a database that results from associating the portable terminal apparatus and the plurality of printers, pieces of operation information on which are targets for display in the portable terminal apparatus with each other,
   wherein the processor performs processing that updates the database based on setting information that is received from the portable terminal apparatus.

8. The server system according to claim 1, wherein, in the case of a first display setting, the processor performs processing that causes a name of a file that is being printed to be displayed on the display unit of the portable terminal apparatus, and
   wherein, in the case of a second display setting that is different from the first display setting, the processor performs processing that causes information that substitutes for the name of the file, to be displayed on the display unit of the portable terminal apparatus.

9. The server system according to claim 1, wherein the processor performs processing that causes the display screen, within one screen of which pieces of job history information on a plurality of the printers are arranged, to be displayed on the display unit of the portable terminal apparatus.

10. The server system according to claim 1, wherein the processor performs at least one of processing that causes a display area for the printer on standby to be displayed in a smaller size than a display area for the printer that is performing a job, processing that causes a display area for the selected printer to be displayed in a greater size than a display area for the printer that is not selected, and processing that causes a display area for the printer in which an error occurs to be displayed in a greater size than a display area for the printer in which the error does not occur.

11. A portable terminal apparatus that is communicatively connected to a server system which collects operation information on a printer, through a network, the apparatus comprising:
   a communication interface that receives operation information on the printer;
   a display unit on which the operation information is displayed; and
   a processor that performs control of display on the display unit,
   wherein the processor performs processing that displays a display screen, within one screen of which pieces of information that are remaining times to completion of printing by a plurality of the printers or pieces of printing completion time information on the plurality of the printers are arranged, and
   wherein the processor performs processing that causes a display area for a first printer and a display area for a second printer which is different from the first printer, among the plurality of the printers, to be displayed in different sizes on the display unit of the portable terminal apparatus.

12. The portable terminal apparatus according to claim 11, wherein, in a case where any printer is selected from among the plurality of the printers, the pieces of remaining-time information or the pieces of printing completion time information on which are displayed, the processor performs processing that enlarges the display area for the selected printer and displays detail information.

13. The portable terminal apparatus according to claim 11, wherein the processor performs counting-down processing of the remaining time that is the information, based on the remaining-time information that is received by the communication interface and on clocking information from a timer, and performs processing that displays the display screen, within one screen of which the pieces of remaining-time information on the plurality of the printers, which results after the counting-down processing are performed on the plurality of the printers, are arranged.

14. A non-transitory computer-readable storage medium on which a program that causes a portable terminal apparatus, which is communicatively connected to a server system that collects operation information on a printer, through a network, to operate is stored, the program causing the computer to function as:
- a communication interface that receives the operation information on the printer; and
- a processor that performs control of display on the display unit on which the operation information is displayed,
- wherein the processor performs processing that displays a display screen, within one screen of which pieces of information that are remaining times to completion of printing by a plurality of the printers or pieces of printing completion time information on the plurality of the printers are arranged, and
- wherein the processor performs processing that causes a display area for a first printer and a display area for a second printer which is different from the first printer, among the plurality of the printers, to be displayed in different sizes on the display unit.

\* \* \* \* \*